United States Patent
Thaler

[19]

[11] Patent Number: 5,852,815
[45] Date of Patent: Dec. 22, 1998

[54] NEURAL NETWORK BASED PROTOTYPING SYSTEM AND METHOD

[76] Inventor: Stephen L. Thaler, 12906 Autumn View Dr., St. Louis, Mo. 63146

[21] Appl. No.: 79,730

[22] Filed: May 15, 1998

Related U.S. Application Data

[62] Division of Ser. No. 592,767, Jan. 26, 1996.

[51] Int. Cl.$^6$ .................................................. G06F 15/18
[52] U.S. Cl. ................................ 706/16; 706/20; 706/25; 706/39
[58] Field of Search ................................. 706/16, 20, 25, 706/39

[56] References Cited

U.S. PATENT DOCUMENTS

| | | | |
|---|---|---|---|
| 4,591,980 | 5/1986 | Huberman et al. | 364/DIG. 1 |
| 4,941,122 | 7/1990 | Weideman | 706/20 |
| 5,058,184 | 10/1991 | Fukushima | 382/37 |
| 5,153,923 | 10/1992 | Matsuba et al. | 382/158 |
| 5,197,114 | 3/1993 | Skeirik | 706/23 |
| 5,214,715 | 5/1993 | Carpenter et al. | 706/20 |
| 5,235,673 | 8/1993 | Austvold et al. | 706/44 |
| 5,239,593 | 8/1993 | Wittner et al. | 706/10 |
| 5,239,594 | 8/1993 | Yoda | 706/20 |
| 5,241,620 | 8/1993 | Ruggiero | 706/16 |
| 5,299,285 | 3/1994 | Tawel | 706/25 |
| 5,303,328 | 4/1994 | Masui et al. | 706/25 |
| 5,303,329 | 4/1994 | Mead et al. | 706/50 |
| 5,303,330 | 4/1994 | Gersho et al. | 706/16 |
| 5,416,888 | 5/1995 | Shimokawa | 706/16 |
| 5,422,961 | 6/1995 | Simard | 382/224 |
| 5,424,959 | 6/1995 | Reyes et al. | 364/498 |
| 5,452,400 | 9/1995 | Takahashi et al. | 706/19 |
| 5,465,308 | 11/1995 | Hutcheson et al. | 706/20 |
| 5,500,905 | 3/1996 | Martin et al. | 382/157 |
| 5,588,091 | 12/1996 | Alkon et al. | 706/20 |
| 5,692,107 | 11/1997 | Simoudis et al. | 706/12 |
| 5,701,400 | 12/1997 | Amado | 706/45 |

*Primary Examiner*—George B. Davis
*Attorney, Agent, or Firm*—Haverstock, Garrett & Roberts

[57] ABSTRACT

Constructing and simulating artificial neural networks and components thereof within a spreadsheet environment results in user friendly neural networks which do not require algorithmic based software in order to train or operate. Such neural networks can be easily cascaded to form complex neural networks and neural network systems, including neural networks capable of self-organizing so as to self-train within a spreadsheet, neural networks which train simultaneously within a spreadsheet, and neural networks capable of autonomously moving, monitoring, analyzing, and altering data within a spreadsheet. Neural networks can also be cascaded together in self training neural network form to achieve a device prototyping system.

13 Claims, 35 Drawing Sheets

Fig. 10

| | A | B | C | D | E | F | G | H | I | J |
|---|---|---|---|---|---|---|---|---|---|---|
| 1 | in 1 | in 2 | | =A1 | =B1 | | | =H3 | =H1-J1 | out |
| 2 | | | | | | | | | | |
| 3 | | | | $w^h_{11}$ | $w^h_{12}$ | =1/(1+EXP(-F6)) | $w^o_{11}$ | =1/(1+EXP(-H4)) | | |
| 4 | | | | $\theta^h_1$ | | =1/(1+EXP(-F7)) | $w^o_{12}$ | =SUMPRODUCT(F3:F5,G3:G5)+G6 | | |
| 5 | | | | $w^h_{21}$ | $w^h_{22}$ | =1/(1+EXP(-F8)) | $w^o_{13}$ | | | |
| 6 | | | | $\theta^h_2$ | | =SUMPRODUCT(D1:E1,D3:E3) + D4 | $\theta^o_1$ | | | |
| 7 | | | | $w^h_{31}$ | $w^h_{32}$ | =SUMPRODUCT(D1:E1,D5:E5) + D6 | | | | |
| 8 | | | | $\theta^h_3$ | | =SUMPRODUCT(D1:E1,D7:E7) + D8 | | | | |

| | A | B | C | D | E | F | G | H | I |
|---|---|---|---|---|---|---|---|---|---|
| 9 | | | | =D1+Δ | =E1+Δ | | | | |
| 10 | | | | | | | | | |
| 11 | | | | $w^h_{11}$ | $w^h_{12}$ | = 1/(1+EXP(-F14)) | $w^o_{11}$ | | |
| 12 | | | | $\theta^h_1$ | | = 1/(1+EXP(-F15)) | $w^o_{12}$ | =1/(1+EXP(-H12)) | |
| 13 | | | | $w^h_{21}$ | $w^h_{22}$ | = 1/(1+EXP(-F16)) | $w^o_{13}$ | =SUMPRODUCT(F11:F13,G11:G13)+G14 | |
| 14 | | | | $\theta^h_2$ | | = SUMPRODUCT(D9:E9,D11:E11) + D12 | $\theta^o_1$ | | |
| 15 | | | | $w^h_{31}$ | $w^h_{32}$ | = SUMPRODUCT(D9:E9,D13:E13) + D14 | | | |
| 16 | | | | $\theta^h_3$ | | = SUMPRODUCT(D9:E9,D15:E15) + D16 | | | |

*Fig. 11*

| | A | B | C | D | E | F | G | H | I |
|---|---|---|---|---|---|---|---|---|---|
| 17 | | | | | | | | | |
| 18 | | | | | | = (F11-F3)/(F14-F6) | | = (H11-H3)/(H12-H4) | |
| 19 | | | | | | = (F12-F4)/(F15-F7) | | | |
| 20 | | | | | | = (F13-F5)/(F16-F8) | | | |
| 21 | | | | | | | | | |
| 22 | | | | | | | | | |
| 23 | | | | | | | | | |
| 24 | | | | | | | | | |

*Fig. 12*

|  | A | B | C | D | E | F | G | H | I |
|---|---|---|---|---|---|---|---|---|---|
| 33 | | | | | | | | | |
| 34 | | | | = F26*D1 | = F26*E1 | | = H26*F3 | | |
| 35 | | | | = F26*1 | | | = H26*F4 | | |
| 36 | | | | = F28*D1 | = F28*E1 | | = H26*F5 | | |
| 37 | | | | = F28*1 | | | = H26*1 | | |
| 38 | | | | = F30*D1 | = F30*E1 | | | | |
| 39 | | | | = F30*1 | | | | | |
| 40 | | | | | | | | | |

Fig. 14

```
Sub Train()
  lasti = Cells(1,6)
  lastEpoch = Cells(1,7)
  If lasti = 0 And lastEpoch = 0 Then
    Cells(3, 4) = 16*(0.5-Rnd())
    Cells(3, 5) = 16*(0.5-Rnd())
    Cells(4, 4) = 16*(0.5-Rnd())
    Cells(5, 4) = 16*(0.5-Rnd())
    Cells(5, 5) = 16*(0.5-Rnd())
    Cells(6, 4) = 16*(0.5-Rnd())
    Cells(7, 4) = 16*(0.5-Rnd())
    Cells(7, 5) = 16*(0.5-Rnd())
    Cells(8, 4) = 16*(0.5-Rnd())
    Cells(3, 7) = 16*(0.5-Rnd())
    Cells(4, 7) = 16*(0.5-Rnd())
    Cells(5, 7) = 16*(0.5-Rnd())
    Cells(6, 7) = 16*(0.5-Rnd())
  End If
```

*Fig. 16 A*

```
For Epoch = 1 To 1000
  If lasti <> 0 Then lasti = lasti + 1
  If Epoch > 1 Then lasti = 0
  For i = lasti To 300
    Calculate
    Cells(i + 3, 4) = Cells(i + 3, 4) + Cells(i + 34, 4)
    Cells(i + 3, 5) = Cells(i + 3, 5) + Cells(i + 34, 5)
    Cells(i + 4, 4) = Cells(i + 4, 4) + Cells(i + 35, 4)
    Cells(i + 5, 4) = Cells(i + 5, 4) + Cells(i + 36, 4)
    Cells(i + 5, 5) = Cells(i + 5, 5) + Cells(i + 36, 5)
    Cells(i + 6, 4) = Cells(i + 6, 4) + Cells(i + 37, 4)
    Cells(i + 7, 4) = Cells(i + 7, 4) + Cells(i + 38, 4)
    Cells(i + 7, 5) = Cells(i + 7, 5) + Cells(i + 38, 5)
    Cells(i + 8, 4) = Cells(i + 8, 4) + Cells(i + 39, 4)
    Cells(i + 3, 7) = Cells(i + 3, 7) + Cells(i + 34, 7)
    Cells(i + 4, 7) = Cells(i + 4, 7) + Cells(i + 35, 7)
    Cells(i + 5, 7) = Cells(i + 5, 7) + Cells(i + 36, 6)
    Cells(i + 6, 7) = Cells(i + 6, 7) + Cells(i + 37, 6)
    If Cells(i + 3, 4) = 0 And Cells(i + 3, 5) = 0 Then Exit For
    Range (Cells(i + 1, 4), Cells(i + 39, 8)). Select
    Selection Copy
    Range (Cells(i + 2, 4), Cells(i + 40, 8)). Select
    ActiveSheet.Paste
    Cells(1, 6) = i
  Next i
  Range (Cells(i + 1, 4), Cells(i + 39, 8)). Select
  Selection.Copy
  Range (Cells(1, 4), Cells(39, 8)). Select
  ActiveSheet.Paste
  Range (Cells(i + 1, 4), Cells(i + 39, 8)). Select
  Selection.Delete
Next Epoch
End Sub
```

*Fig. 16B*

|   | A | B | C | D | E | F | G | H | I | J | K | L | M | N | O | P | Q | R | S |
|---|---|---|---|---|---|---|---|---|---|---|---|---|---|---|---|---|---|---|---|
| 1 |   | p | xp1 | xp2 | xp3 | xp4 | xp5 | xp6 | xp7 | xp8 | xp9 | yp1 | yp2 | yp3 | yp4 | yp5 | yp6 | yp7 | yp8 | yp9 |
| 2 |   |   |   |   |   |   |   |   |   |   |   |   |   |   |   |   |   |   |   |
| 3 |   |   |   |   |   |   |   |   |   |   |   |   |   |   |   |   |   |   |   |
| 4 |   | 1 | x11 | x12 | x13 | x14 | x15 | x16 | x17 | x18 | x19 | y11 | y12 | y13 | y14 | y15 | y16 | y17 | y18 | y19 |
| 5 |   | 2 | x21 | x22 | x23 | x24 | x25 | x26 | x27 | x28 | x29 | y21 | y22 | y23 | y24 | y25 | y26 | y27 | y28 | y29 |
| 6 |   | 3 | x31 | x32 | x33 | x34 | x35 | x36 | x37 | x38 | x39 | y31 | y32 | y33 | y34 | y35 | y36 | y37 | y38 | y39 |
| 7 |   | 4 | x41 | x42 | x43 | x44 | x45 | x46 | x47 | x48 | x49 | y41 | y42 | y43 | y44 | y45 | y46 | y47 | y48 | y49 |
| 8 |   | 5 | x51 | x52 | x53 | x54 | x55 | x56 | x57 | x58 | x59 | y51 | y52 | y53 | y54 | y55 | y56 | y57 | y58 | y59 |
| 9 |   | 6 | x61 | x62 | x63 | x64 | x65 | x66 | x67 | x68 | x69 | y61 | y62 | y63 | y64 | y65 | y66 | y67 | y68 | y69 |
| 10 |   | 7 | x71 | x72 | x73 | x74 | x75 | x76 | x77 | x78 | x79 | y71 | y72 | y73 | y74 | y75 | y76 | y77 | y78 | y79 |
| 11 |   | 8 | x81 | x82 | x83 | x84 | x85 | x86 | x87 | x88 | x89 | y81 | y82 | y83 | y84 | y85 | y86 | y87 | y88 | y89 |
| 12 |   | 9 | x91 | x92 | x93 | x94 | x95 | x96 | x97 | x98 | x99 | y91 | y92 | y93 | y94 | y95 | y96 | y97 | y98 | y99 |

*Fig. 17*

|   | AK | AL | AM | AN | AO | ... | BB |
|---|---|---|---|---|---|---|---|
| 1 | MAX(C:C) | MAX(D:D) | MAX(E:E) | MAX(F:F) | MAX(G:G) | ... | MAX(S:S) |
| 2 | MIN(C:C) | MIN(D:D) | MIN(E:E) | MIN(F:F) | MIN(G:G) | ... | MIN(S:S) |
| 3 | =AK1-AK2 | =AL1-AL2 | =AM1-AM2 | =AN1-AN2 | =AO1-AO2 | ... | =BB1-BB2 |

*Fig. 18*

| | U | | V | | W | | X | |
|---|---|---|---|---|---|---|---|---|
| 1 | xp | | xpi + delta | | wji | | updated wji | |
| 2 | | | | | | | | |
| 3 | =(B4-AK2)/AK3 | | =IF(U3<0.5, U3+0.1,U3-0.1) | | w11 | | =SUMPRODUCT(AI3:AI11,AB3:AB11)*Y7*U3+W3 | |
| 4 | =(C4-AL2)/AL3 | | =IF(U4<0.5, U4+0.1,U4-0.1) | | w12 | | =SUMPRODUCT(AI3:AI11,AB3:AB11)*Y7*U4+W4 | |
| 5 | =(D4-AM2)/AM3 | | =IF(U5<0.5, U5+0.1,U5-0.1) | | w13 | | =SUMPRODUCT(AI3:AI11,AB3:AB11)*Y7*U5+W5 | |
| 6 | =(E4-AN2)/AN3 | | =IF(U6<0.5, U6+0.1,U6-0.1) | | w14 | | =SUMPRODUCT(AI3:AI11,AB3:AB11)*Y7*U6+W6 | |
| 7 | =(F4-AO2)/AO3 | | =IF(U7<0.5, U7+0.1,U7-0.1) | | w15 | | =SUMPRODUCT(AI3:AI11,AB3:AB11)*Y7*U7+W7 | |
| 8 | =(G4-AP2)/AP3 | | =IF(U8<0.5, U8+0.1,U8-0.1) | | w16 | | =SUMPRODUCT(AI3:AI11,AB3:AB11)*Y7*U8+W8 | |
| 9 | =(H4-AQ2)/AQ3 | | =IF(U9<0.5, U9+0.1,U9-0.1) | | w17 | | =SUMPRODUCT(AI3:AI11,AB3:AB11)*Y7*U9+W9 | |
| 10 | =(I4-AR2)/AR3 | | =IF(U10<0.5, U10+0.1,U10-0.1) | | w18 | | =SUMPRODUCT(AI3:AI11,AB3:AB11)*Y7*U10+W10 | |
| 11 | =(J4-AS2)/AS3 | | =IF(U11<0.5, U11+0.1,U11-0.1) | | w19 | | =SUMPRODUCT(AI3:AI11,AB3:AB11)*Y7*U11+W11 | |
| 12 | | | | | q1 | | =SUMPRODUCT(AI3:AI11,AB3:AB11)*Y7*1+W12 | |
| 13 | =U3 | | =V3 | | w21 | | =SUMPRODUCT(AI13:AI21,AB13:AB21)*Y17*U13+W13 | |
| 14 | =U4 | | =V4 | | w22 | | =SUMPRODUCT(AI13:AI21,AB13:AB21)*Y17*U14+W14 | |
| 15 | =U5 | | =V5 | | w23 | | =SUMPRODUCT(AI13:AI21,AB13:AB21)*Y17*U15+W15 | |
| 16 | =U6 | | =V6 | | w24 | | =SUMPRODUCT(AI13:AI21,AB13:AB21)*Y17*U16+W16 | |
| 17 | =U7 | | =V7 | | w25 | | =SUMPRODUCT(AI13:AI21,AB13:AB21)*Y17*U17+W17 | |
| 18 | =U8 | | =V8 | | w26 | | =SUMPRODUCT(AI13:AI21,AB13:AB21)*Y17*U18+W18 | |
| 19 | =U9 | | =V9 | | w27 | | =SUMPRODUCT(AI13:AI21,AB13:AB21)*Y17*U19+W19 | |
| 20 | =U10 | | =V10 | | w28 | | =SUMPRODUCT(AI13:AI21,AB13:AB21)*Y17*U20+W20 | |
| 21 | =U11 | | =V11 | | w29 | | =SUMPRODUCT(AI13:AI21,AB13:AB21)*Y17*U21+W21 | |
| 22 | | | | | q2 | | =SUMPRODUCT(AI13:AI21,AB13:AB21)*Y17*1+W22 | |

| | Y | Z | AA | AB | AC |
|---|---|---|---|---|---|
| 1 | calculation of dactj/dnetj | act j(xp) | act j(xp + D) | wkj | updated wkj |
| 2 | | | | | |
| 3 | =1/(1+EXP(-(SUMPRODUCT(U3:U11,W3:W11)+W12))) | =Y3 | =IF(Z3<0.5,Z3+0.1,Z3-0.1) | w11 | =AH3*Z3+AB3 |
| 4 | =SUMPRODUCT(U3:U11,W3:W11)+W12 | =Y13 | =IF(Z4<0.5,Z4+0.1,Z4-0.1) | w12 | =AH3*Z4+AB4 |
| 5 | =1/(1+EXP(-(SUMPRODUCT(V3:V11,W3:W11)+W12))) | =Y23 | =IF(Z5<0.5,Z5+0.1,Z5-0.1) | w13 | =AH3*Z5+AB5 |
| 6 | =SUMPRODUCT(V3:V11,W3:W11)+W12 | =Y33 | =IF(Z6<0.5,Z6+0.1,Z6-0.1) | w14 | =AH3*Z6+AB6 |
| 7 | =(Y5-Y3)/(Y6-Y4) | =Y43 | =IF(Z7<0.5,Z7+0.1,Z7-0.1) | w15 | =AH3*Z7+AB7 |
| 8 | | =Y53 | =IF(Z8<0.5,Z8+0.1,Z8-0.1) | w16 | =AH3*Z8+AB8 |
| 9 | | =Y63 | =IF(Z9<0.5,Z9+0.1,Z9-0.1) | w17 | =AH3*Z9+AB9 |
| 10 | | =Y73 | =IF(Z10<0.5,Z10+0.1,Z10-0.1) | w18 | =AH3*Z10+AB10 |
| 11 | | =Y83 | =IF(Z11<0.5,Z11+0.1,Z11-0.1) | w19 | =AH3*Z11+AB11 |
| 12 | | | | q1 | =AH3+AB12 |
| 13 | =1/(1+EXP(-(SUMPRODUCT(U13:U21,W13:W21)+W22))) | =Y3 | =IF(Z13<0.5,Z13+0.1,Z13-0.1) | w21 | =AH13*Z13+AB13 |
| 14 | =SUMPRODUCT(U13:U21,W13:W21)+W22 | =Y13 | =IF(Z14<0.5,Z14+0.1,Z14-0.1) | w22 | =AH13*Z14+AB14 |
| 15 | =1/(1+EXP(-(SUMPRODUCT(V13:V21,W13:W21)+W22))) | =Y23 | =IF(Z15<0.5,Z15+0.1,Z15-0.1) | w23 | =AH13*Z15+AB15 |
| 16 | =SUMPRODUCT(V13:V21,W13:W21)+W22 | =Y33 | =IF(Z16<0.5,Z16+0.1,Z16-0.1) | w24 | =AH13*Z16+AB16 |
| 17 | =(Y15-Y13)/(Y16-Y14) | =Y43 | =IF(Z17<0.5,Z17+0.1,Z17-0.1) | w25 | =AH13*Z17+AB17 |
| 18 | | =Y53 | =IF(Z18<0.5,Z18+0.1,Z18-0.1) | w26 | =AH13*Z18+AB18 |
| 19 | | =Y63 | =IF(Z19<0.5,Z19+0.1,Z19-0.1) | w27 | =AH13*Z19+AB19 |
| 20 | | =Y73 | =IF(Z20<0.5,Z20+0.1,Z20-0.1) | w28 | =AH13*Z20+AB20 |
| 21 | | =Y83 | =IF(Z21<0.5,Z21+0.1,Z21-0.1) | w29 | =AH13*Z21+AB21 |
| 22 | | | | q2 | =AH13+AB22 |

| | AD | AE | AF | AG | AH | AI |
|---|---|---|---|---|---|---|
| 1 | calculation of dactk/dnetk | ok | yk | yk-ok | | dk | dK |
| 2 | | | | | | | |
| 3 | =1/(1+EXP(-(SUMPRODUCT(Z3:Z11,AB3:AB11)+AB12))) | =AD3 | yp1 | =AF3-AD3 | | =AG3*AD7 | =AG3*AD7 |
| 4 | =SUMPRODUCT(Z3:Z11,AB3:AB11)+AB12 | =AD13 | yp2 | =AG13 | | | =AG3*AD17 |
| 5 | =1/(1+EXP(-(SUMPRODUCT(AA3:AA11,AB3:AB11)+AB12))) | =AD23 | yp3 | =AG23 | | | =AH23 |
| 6 | =SUMPRODUCT(AA3:AA11,AB3:AB11)+AB12 | =AD33 | yp4 | =AG33 | | | =AH33 |
| 7 | =(AD5-AD3)/(AD6-AD4) | =AD43 | yp5 | =AG43 | | | =AH43 |
| 8 | | =AD53 | yp6 | =AG53 | | | =AH53 |
| 9 | | =AD63 | yp7 | =AG63 | | | =AH63 |
| 10 | | =AD73 | yp8 | =AG73 | | | =AH73 |
| 11 | | =AD83 | yp9 | =AH83 | | | =AH83 |
| 12 | | | RMS= | =SQRT(SUMSQ(AG3:AG11)/9) | | | |
| 13 | =1/(1+EXP(-(SUMPRODUCT(Z13:Z21,AB13:AB21)+AB22))) | | =AF4 | =AF13-AD13 | | =AG13*AD17 | =AG3*AD7 |
| 14 | =SUMPRODUCT(Z13:Z21,AB13:AB21)+AB22 | | | | | | =AG13*AD17 |
| 15 | =1/(1+EXP(-(SUMPRODUCT(AA13:AA21,AB13:AB21)+AB22))) | | | | | | =AI5 |
| 16 | =SUMPRODUCT(AA13:AA21,AB13:AB21)+AB22 | | | | | | =AI6 |
| 17 | =(AD15-AD13)/(AD16-AD14) | | | | | | =AI7 |
| 18 | | | | | | | =AI8 |
| 19 | | | | | | | =AI9 |
| 20 | | | | | | | =AI10 |
| 21 | | | | | | | =AI11 |
| 22 | | | | | | | |

Fig. 21

```
Range ("X3:X92").Select
Selection.Copy
Range ("W3").Select
Selection.PasteSpecial Paste:=xlValues, Operation:=xlNone, _
    SkipBlanks: =False, Transpose: =False
Range ("AC3:AC92").Select
Applicaton.CutCopyMode = False
Selection.Copy
Range ("AB3").Select
Selection.PasteSpecial Paste: =xlValues, Operation: =xlNone,_
    SkipBlanks: =False, Transpose: =False
```

$$F(\theta) = \frac{1}{2} + \frac{2}{\pi} \left( \sin \theta + \frac{1}{3} \sin 3\theta + \frac{1}{5} \sin 5\theta + \ldots \right)$$

Dim ilocate, des     ← 252

```
Sub Move()
    For i = 1 To 1000
        Calculate  ← 254
        zcount = 0
256 ⎰   For j = 1 To 9
    ⎱       If cells(i + 2, j) = 0 Then zcount = zcount + 1
        Next j
        If zcount = 9 Then Exit For
258 —— If Cells(i+2, 25) > 30 And Cells(1, 10) = 0 Then
            Cells(i+2, 10)="*"
        If Cells(i + 2, 25) > 30 And Cells(1, 10) = 1 Then
260 ⎰       Range (Cells(i + 2, 1), Cells(i + 2, 9)).Select
    ⎱       Selection.Clear
        End If Range (Cells(i + 2, 11), Cells(1 + 77, 35)).Select
        Selection.Copy
        Range (Cells(i + 3, 11), Cells(i + 78, 35)).Select
262 ⎰   ActiveSheet.Paste
        Range (Cells(i + 2, 11), Cells(i + 2, 35)).Select
        Selection.Copy
        Selection.PasteSpecial Paste: =xlValues, Operation:
            =xlNone, _
        SkipBlanks: =False, Transpose: =False Next i
        ilocate = i
End Sub
```

*Fig. 29*

NEURAL NETWORK BASED PROTOTYPING SYSTEM AND METHOD

This application is a divisional of application Ser. No. 08/592,767 filed Jan. 26, 1996.

FIELD OF THE INVENTION

This invention relates generally to artificial neural networks and more particularly, to artificial neural networks implemented in a non-algorithmic fashion in a data space, such as a spreadsheet, so as to facilitate cascading of such artificial neural networks and so as to facilitate artificial neural networks capable of operating within the data space, including networks which move through the data space and self-train on data therewithin.

BACKGROUND OF THE INVENTION

This application is related to applicant's co-pending application Ser. No. 08/323,238 filed Oct. 13, 1994, entitled Device For The Autonomous Generation Of Useful Information, in which the "creativity machine" paradigm was introduced. The creativity machine paradigm involves progressively purturbing a first neural network having a predetermined knowledge domain such that the perturbed network continuously outputs a stream of concepts, and monitoring the outputs or stream of concepts with a second neural network which is trained to identify only useful concepts. The perturbations may be achieved by different means, including the introduction of noise to the network, or degradation of the network. Importantly, the present application provides an excellent system for constructing such creativity machines, and further builds upon the creativity machine invention to achieve self training neural networks.

The current explosion of information has made it necessary to develop new techniques for handling and analyzing such information. In this regard, it would be helpful to be able to effectively discover regularities and trends within data and to be able to effectively sort and/or organize data. Currently, various algorithmic techniques and systems may be utilized to analyze data, however, such techniques and systems generally fail to display the creativity needed to enable them to organize the data and exhaust sets of data of all potential discoveries. The use of neural networks for such tasks would be advantageous.

Further, the advantages of new artificial neural networks (ANNs) are ever increasing. Currently, such artificial neural networks are often trained and implemented algorithmically. These techniques require the skills of a neural network specialist who may spend many hours developing the training and/or implementation software for such algorithms. Further, when using algorithms to train artificial neural networks, once new training data is obtained, the new training data must be manually appended to the preexisting set of training data and network training must be reinitiated, requiring additional man hours. Disadvantageously, if the newly acquired training data does not fit the pattern of preexisting training data, the generalization capacity of the network may be lowered.

An additional drawback to traditional algorithm implemented training and operation of artificial neural networks is that within such schemes, individual activation levels are only momentarily visible and accessible, as when the governing algorithm evaluates the sigmoidal excitation of any given node or neuron. Except for this fleeting appearance during program execution, a neuron's excitation, or activation level, is quickly obscured by redistribution among downstream processing elements.

Accordingly, it is desirable and advantageous to provide a simpler method of training, implementing, and simulating artificial neural networks. It is further desirable to provide artificial neural networks which can be easily cascaded together to facilitate the construction of more complex artificial neural network systems. It also is desirable and advantageous to provide neural networks which can be configured to perform a variety of tasks, including self training artificial neural networks, as well as networks capable of analyzing, sorting, and organizing data.

A principal object of the present invention is to provide a user friendly system of implementing or simulating neural networks in which movement of such networks and cascading of such networks is facilitated.

Another object of the present invention is to provide self training artificial neural networks.

A further object of the present invention is to provide artificial neural networks capable of analyzing data within a data space.

Yet another object of the present invention is to provide artificial neural networks which are mobile within a data space.

Still another object of the present invention is to provide artificial neural networks which can be easily duplicated within a data space and which can be easily interconnected to facilitate the construction of more complex artificial neural network systems.

SUMMARY OF THE INVENTION

These and other objects of the invention are attained by artificial neural networks which are implemented in a data space, such as a spreadsheet within some spreadsheet application such as Microsoft Excel which is operable with most IBM compatible personal computers having a model 386 or higher level microprocessor and sufficient memory associated therewith, such computers typically including a monitor or other display device. Of course, the faster the computer speed, the better the results obtained. As used herein the term neural network object (NNO) includes artificial neural networks or combinations of artificial neural networks implemented within such a data space and having an associated set of properties and methods. These properties and methods may be incorporated within a knowledge domain of each artificial neural network and may also be incorporated in programs associated with the artificial neural networks. The data space or spreadsheet includes a plurality of cells and the spreadsheet application allows for association or interrelating of such cells through relative cell referencing. While use of the spreadsheet application Microsoft Excel is suggested herein, it is understood that other spreadsheet applications could be utilized, and it if further understood that new applications could be engineered for the purpose of creating a data space suitable for construction and operation of neural network objects as described herein. Moreover, while the various neural network objects described below may refer to programs being associated therewith, it is understood that in a data space where self referencing is permissible, such programs could be eliminated.

Exploiting the many analogies between biological neurons and cells within a spreadsheet, the state of any given neuron may be evaluated by relative cell referencing and resident spreadsheet functions. Unlike traditional algorithmic network simulation, all neuron activations are simultaneously visible and randomly accessible within the data space simulation. More like a network of virtual, analog devices, this simulation may be considered quasi-parallel, with all neurons updated with each wave of data space calculation or renewal, where spreadsheet renewal is asynchronous with the feed forward algorithm.

Neural network objects are mobile within the data space as provided by the spreadsheet application which typically includes resident commands for cutting and pasting groups of cells. Accordingly, movement of neural network objects is achieved by simultaneously cutting the information within the cell group or cell array comprising the neural network object from one location within the data space and pasting the same information to another location within the data space. Such movement may be accomplished manually or through programs associated with the neural network objects. Alternatively, neural network objects can be replicated using a copy command and moved elsewhere within the data space.

Such neural network objects are advantageously. implemented without requiring any underlying software based algorithm and are therefore extremely versatile and user friendly. Moreover, neural network objects are easily portable such as by saving or storing, on a computer readable storage medium such as a floppy disk, information operable to effect such neural network objects. Further, by relatively referencing the outputs of one neural network object to the inputs of another, neural network objects can be easily cascaded such that the outputs from one neural network object are applied as inputs to another neural network object. The compound or cascaded neural networks which result are transparent in operation and easily accessible for modification and repair. Accordingly, recurrences and all manner of neural network paradigms, including IAC, Boltzmann Machine, Harmonium, Hopfield nets, and self-organizing maps, may be readily implemented.

Importantly, the ease with which neural network objects can be cascaded provides a system where multiple neural network objects may be combined so as to simulate interconnected processes or hardware devices, wherein each neural network object is trained within a knowledge domain of a particular process or hardware device. In addition, this specification provides several examples of other neural network objects in order to demonstrate both their versatility and utility.

One advantageous neural network object provides for the training of an artificial neural network. This self training artificial neural network object (STANNO) is a simple alternative to Adaptive Resonance Technology, disclosed in Carpenter et al U.S. Pat. No. 5,214,715, wherein complex algorithms are utilized to allow neural networks to flexibly adapt to new, emerging information. Advantageously, the STANNO requires no such complex algorithms.

In general, training an artificial neural network requires a set of training data, including multiple input vectors and associated output vectors, and includes various techniques such as backpropagation, involving repetitive application of input vectors to an input layer of the artificial neural network. With each application of an input vector, the actual output of the artificial neural network, obtained at the output layer, can be evaluated in light of the desired output so that the connection weights and/or biases of the artificial neural network can be adjusted.

The self training artificial neural network object or STANNO may include imaging cells which allow the STANNO to observe or input data located within the data space utilizing the aforementioned relative cell referencing scheme. The artificial neural network which is to be trained is itself part of the STANNO, and at least some of the imaging cells may be representative of the input layer of the artificial neural network. The remaining imaging cells can be used by the STANNO to compare the actual output of the artificial neural network with the desired output associated with each particular input vector.

In this regard, the STANNO also includes a training network which is configured to adjust the weights of the artificial neural network as determined by comparing the actual output of the artificial neural network with the desired output. In backpropagation, the training network may include four associated modules to implement the backpropagation training regime. The first module is configured to determine what the activation level of each artificial neural network neuron would be if the inputs thereto are increased by some infinitesimal amount. The second module determines the derivatives of neuron activations with respect to net input thereto. The third module determines error terms and the fourth module determines correction values from which the weights and biases of the artificial neural network can be adjusted. These four modules can be implemented distinctly within the data space or they can be integrated with each other and with the artificial neural network.

The STANNO may be operable to move within the data space such that with each movement thereof the artificial neural network is trained on an input vector and corresponding output vector within the data space. Thus, the STANNO may continuously move through and thereby continuously train the artificial neural network within the data space. Advantageously, the STANNO may also remain stationary while training the artificial neural network on data which is fed directly into the data space, such as data from known systems which may include known devices or processes. Such a data feed may take the form of a dynamic data exchange. Essentially, the STANNO is a network training a network with neither represented in algorithmic code. Advantageously, at any point during training, the artificial neural network may be copied from or moved from the STANNO and placed at another location within the data space or placed in an entirely different data space for operation.

By taking advantage of the unique training ability of the STANNO and the ability to combine neural network objects to simulate interconnected devices, a device prototyping system is achievable. In this device prototyping system, a prototyping neural network is constructed, wherein at least some of the neurons of the prototyping neural network are represented by component neural networks, each trained within a knowledge domain of a component which will be used to construct the device being prototyped. By training the prototyping neural network on predetermined inputs and associated desired outputs, the finalized weighting values associated therewith can be used to determine how to interconnect the components in order to construct the prototyped device.

A second neural network object acts as a data filtering artificial neural network object (DFANNO) whereby data within a data space can be monitored, analyzed, and manipulated in order to either locate novel data or to locate suspect data within the data space. The underlying theory is based on the use of an autoassociative neural network which is a network having a knowledge domain wherein input data vectors within the knowledge domain are mapped to themselves. Thus, if an input vector to the autoassociative neural network falls within the knowledge domain thereof, the result is an output vector therefrom which closely matches the input vector.

When associated with the STANNO the DFANNO is operable to determine whether or not the STANNO has already trained the artificial neural network on a given set of data, or data similar thereto. If the STANNO has already trained the artificial neural network on the set of data, the artificial neural network is not trained on the given set of data, thereby reducing time wasted by retraining on redundant data. Conversely, if the DFANNO determines that the STANNO has not trained the artificial neural network on the data, the STANNO is permitted to train the artificial neural network on such data.

The DFANNO may also operate as a separate entity within a data space. As such, the DFANNO is operable to analyze data within the data space to determine if any of the data does not follow an overall pattern associated with the data, such as data which has been affected by noise or some other disturbance which may have occurred in the data gathering process. When the DFANNO finds such data it is operable to either remove, delete, or relocate the data from the data space or to in some way tag the data as being suspect. Accordingly, the DFANNO is also an effective device for eliminating or calling attention to suspect data within a given data space.

A third neural network object acts as a data scanning artificial neural network object (DSANNO) whereby various groupings of data within the data space are examined in attempt to find a set of data values having a predetermined relationship. The DSANNO may be stationary within the data space yet able to focus its attention to various groups of cells within the data space by taking advantage of relative cell referencing. The DSANNO includes a field positioning neural network which is operable to determine the position of the group of cells within the data space which will be analyzed by the DSANNO. Through relative cell referencing, a set of imaging cells associated with the DSANNO is used to develop a working image of the group of cells which will be analyzed. A searching network is then utilized to view the working image from some perspective which is in turn analyzed by a detection network which determines if the set of data values making up the perspective meets the predetermined or desired relationship. Any set meeting the relationship can be tagged or possibly copied to another part of the data space. The DSANNO is thus useful as a tool for examining large databases for data strings having some desired relationship.

The herein described techniques and neural network objects, or components thereof, may advantageously be combined in a variety of ways to develop more complex and advanced neural network systems.

BRIEF DESCRIPTION OF THE DRAWINGS

FIG. 10 is a data space simulation or implementation of the artificial neural network illustrated in FIG. 8;

FIG. 11 illustrates a first module of the training network associated with FIG. 6, the first module operable to determine activation levels when inputs are increased by some small amount;

FIG. 12 illustrates a second module of the training network associated with FIG. 6, the second module operable to determine the derivative of neuron activations with respect to net inputs thereto;

FIG. 14 illustrates a fourth module of the training network associated with FIG. 6, the fourth module operable to determine weight update terms for the artificial neural network illustrated in FIG. 10;

FIGS. 16A and 16B is a Visual Basic program associated with the self training artificial neural network illustrated in FIGS. 10–15;

FIG. 17 illustrates a plurality of sets of training data;

FIGS. 18, 19, 20 and 21 illustrate various portions of an integrated self training artificial neural network object, wherein the training network is integrated with the artificial neural network being trained;

FIG. 22 illustrates a subroutine associated with the integrated self training artificial neural network of FIGS. 18–21;

FIG. 29 is a Visual Basic program associated with the data filtering artificial neural network object of FIG. 28;

DETAILED DESCRIPTION OF THE DRAWINGS

Figure 1:
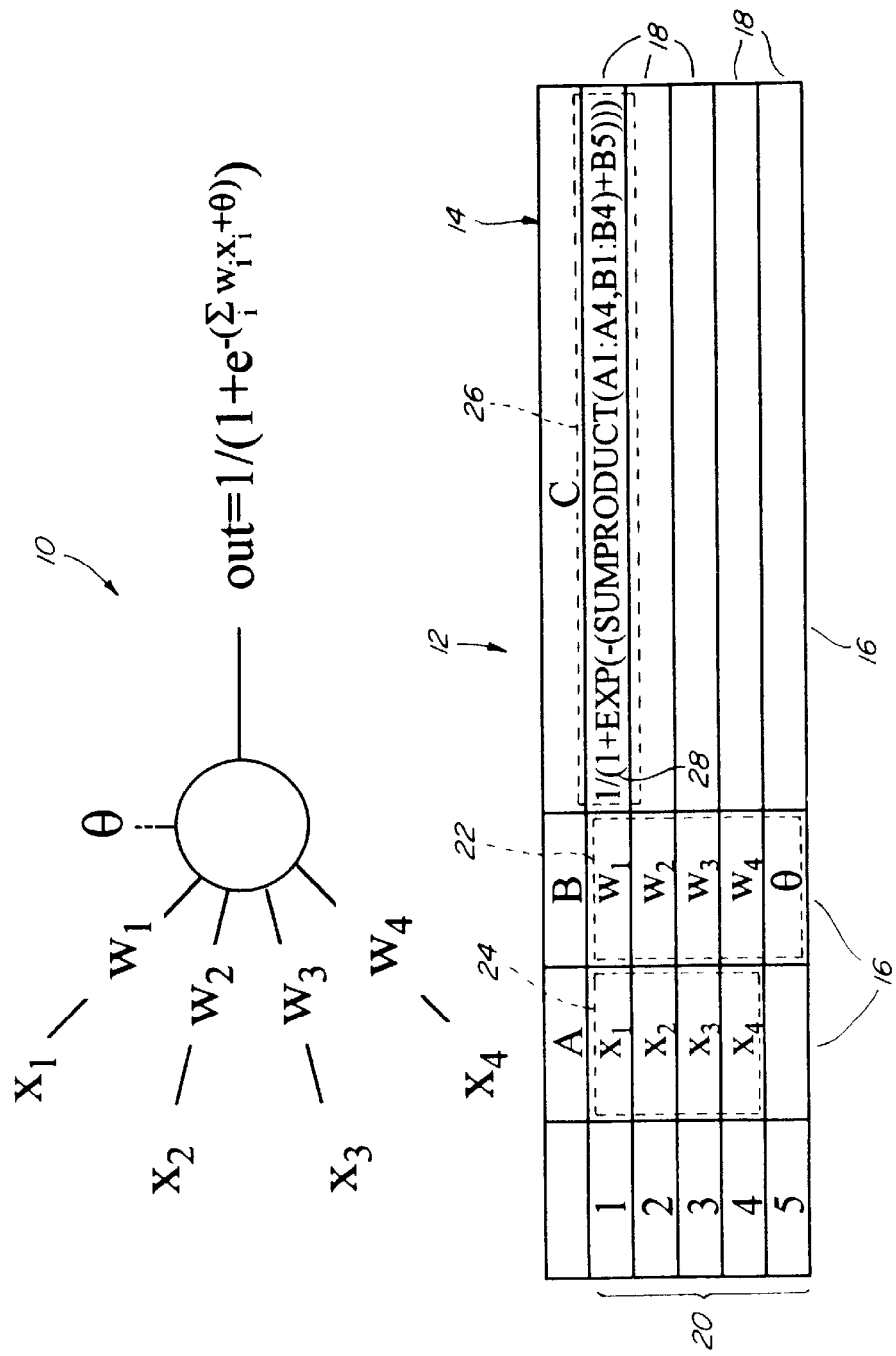
FIG. 1 is an illustration of a traditional neural network neuron and the corresponding data space simulation thereof.

Referring to the drawings more particularly by reference numbers, number 10 in FIG. 1 refers to a classical representation of a neural network neuron and number 12 refers to the implementation of the neuron 10 in a data space 14. The illustrated data space 14 includes a plurality of columns 16 and a plurality of rows 18, each column 16 being identifiable by a letter at the top thereof and each row 18 being identifiable by a number located at the left hand side thereof. The column and row combination results in a plurality of cells 20, each of which may be identified by a corresponding letter and number designation. This data space 14 configuration is typical of spreadsheets within a spreadsheet application.

The data space implementation 12 of neuron 10 is the building block of neural network objects described herein, but deviations may be used which do not deviate from the spirit of the present invention. The data space implementation 12 includes a first plurality of cells 22, in this case five (5) cells, each having an associated predetermined numeric value, $w_1$, $w_2$, $w_3$, $w_4$, and $\theta$ respectively. The number of cells 22 will vary depending on the number of inputs to the neural network neuron 10. In this case, a second plurality of cells 24 contain input values $x_1$, $X_2$, $X_3$, and $x_4$. Accordingly, the plurality of cells 22 include four (4) corresponding weight values $w_1$, $w_2$, $W_3$, and $w_4$, and one bias value $\theta$. As used herein, the terms weight or weighting value include bias values which are presumed to be associated with constant neuron inputs of one (1). In an untrained neural network the numeric value associated with each cell 22 may be randomly assigned while in a trained neural network the numeric values are determined by training the neural network of which the neuron is a part.

Figure 1A:
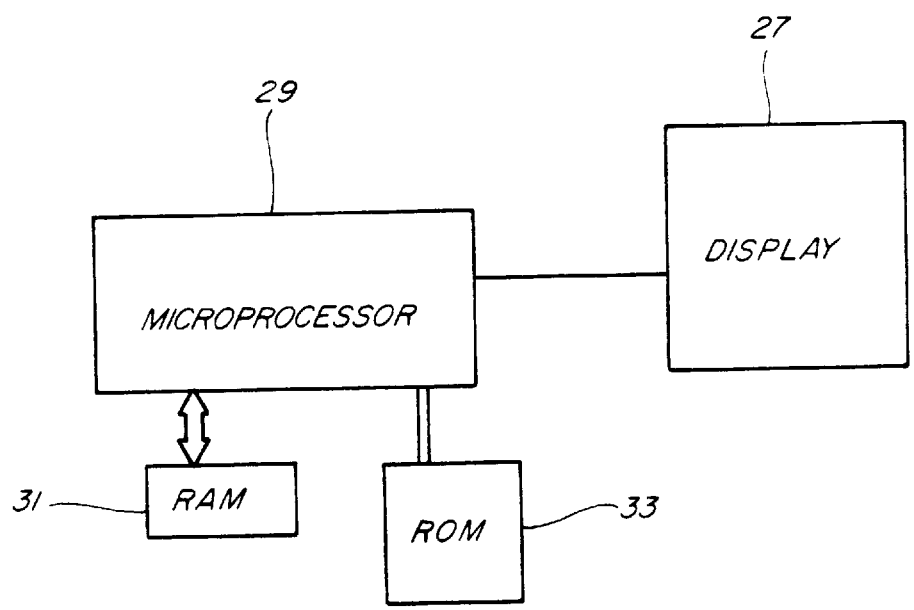
FIG. 1A is a partial block diagram of a computer.

An activation cell 26 contains a transfer function 28 which references each of the cells 22 and each of the cells 24, the transfer function 28 acting to apply the appropriate weights to the appropriate input values in determining an activation level associated with the neuron 10. Accordingly, the numeric value associated with the activation cell 26 is dependent upon the numeric values associated with each of cells 22 and 24 as well as the form of the transfer function 28, which in this case is a sigmoid function, although other known transfer functions could be utilized. During normal operation of neural network objects the transfer function 28 is hidden and the numeric value associated with the activation cell 26 is displayed on a computer screen or other display device 27, see FIG. 1A. Thus, the displayed numeric value represents the activation level of the activation cell 26 and accordingly the neural network neuron 10. As shown in FIG. 1A, a computer such as an IBM compatible personal computer including microprocessor 29, RAM 31, and ROM 33 may be utilized in association with the present invention.

A plurality of data space implemented neurons 12 may be used to construct artificial neural networks in accordance with the present invention. Such networks typically include both hidden layer and output layer neurons. Accordingly, in such networks, input values for a given neuron may be values associated with activation cells of another neuron within the neural network. Utilizing such data space implemented neurons 12 advantageously facilitates construction of artificial neural networks without requiring any specialized algorithm implementing software.

Figure 2:
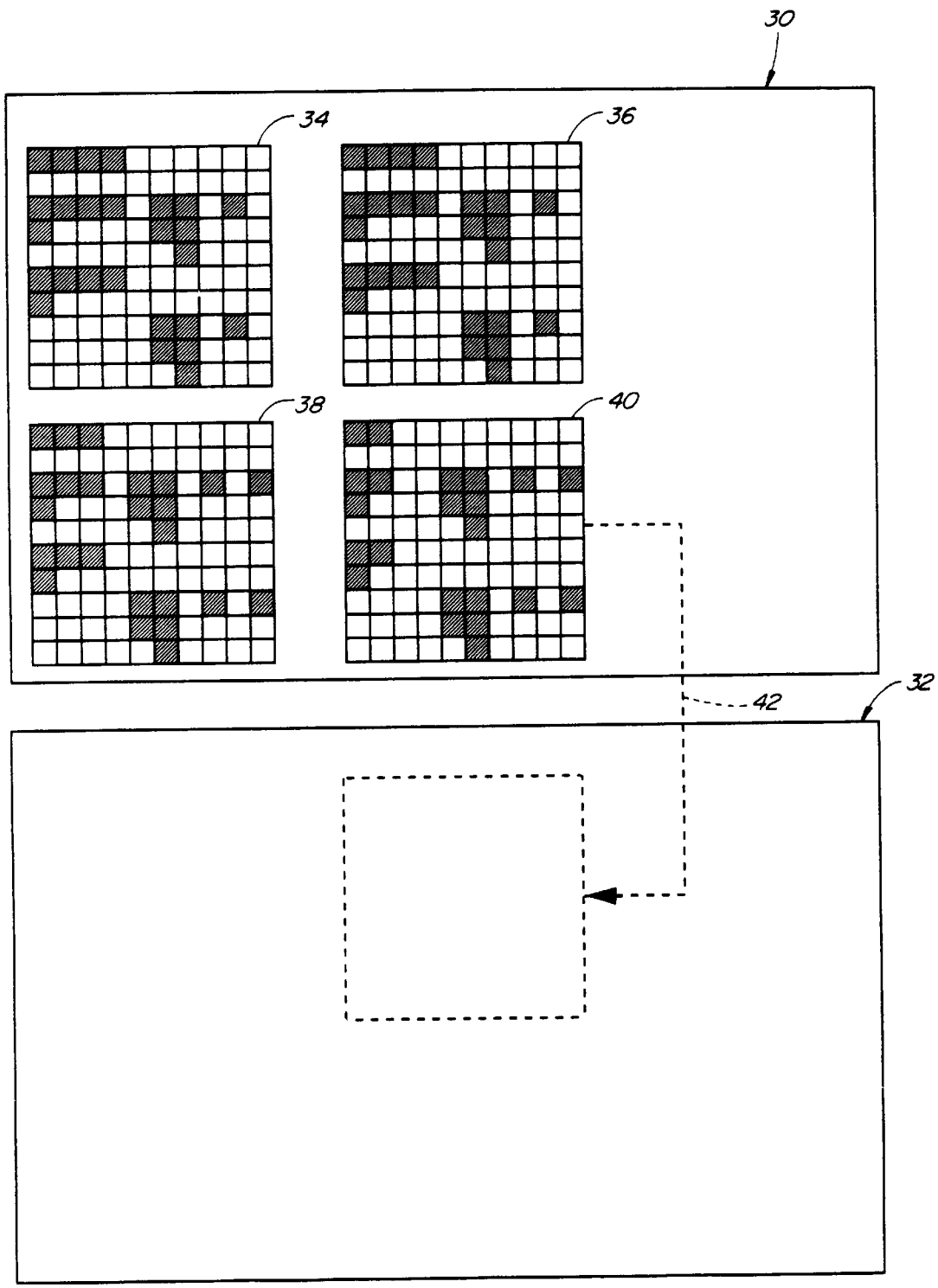
FIG. 2 illustrates a plurality of neural network objects in a system for simulating interconnected processes or hardware devices.

Once a given artificial neural network is constructed or implemented in a spreadsheet or data space 14, advantage may be taken of resident spreadsheet capabilities such as the ability to copy and paste a group of cells or to cut and paste a group of cells. Accordingly, artificial neural networks constructed in accordance with the present invention may be easily interconnected to construct increasingly complex artificial neural networks. One advantageous use for such artificial neural networks is in providing a system for simulating interconnected processes or interconnected devices such as electronic or mechanical devices. Such a system is illustrated in FIG. 2 wherein two data spaces 30 and 32, which may be distinct but associated spreadsheets, such as spreadsheets associated in workbook form, are shown. Located in data space 30 are various neural network objects 34, 36, 38, and 40, in which the cross-hatched regions represent cells associated with the operation of each. By way of example, each neural network object 34, 36, 38, and 40 may be trained within the knowledge domain of some electrical component such as a resistor, capacitor, inductor, or transistor. Of course, the knowledge domain of any electrical component could be incorporated into a neural network object within the data space 30. Such a system would be particularly useful when there is no existing mathematical model for the component's behavior.

Having established a plurality of operable, neural network objects such as 34, 36, 38, and 40, various electronic circuit configurations can then be simulated by copying the neural network objects to the data space 32, as indicated by arrow 42 with respect to neural network object 40, so as to interconnect, through relative cell referencing, the neural network objects in the configuration of the electronic circuit to be simulated. Accordingly, providing a spreadsheet, or plurality of spreadsheets in workbook form, with multiple neural network objects, each trained to emulate a particular electronic device, results in a system for simulating electronic circuits of numerous configurations. Moreover, such a system is advantageously user friendly due to the graphical representation of each neural network object which allows a user to easily manipulate such objects as required for a particular application.

In addition to providing a system for simulating known devices, neural network objects can be configured for numerous purposes. Some important aspects of such neural network objects is their ability to autonomously move within the data space, to operate on or alter data or other objects within the data space, and to self organize.

Figure 3:
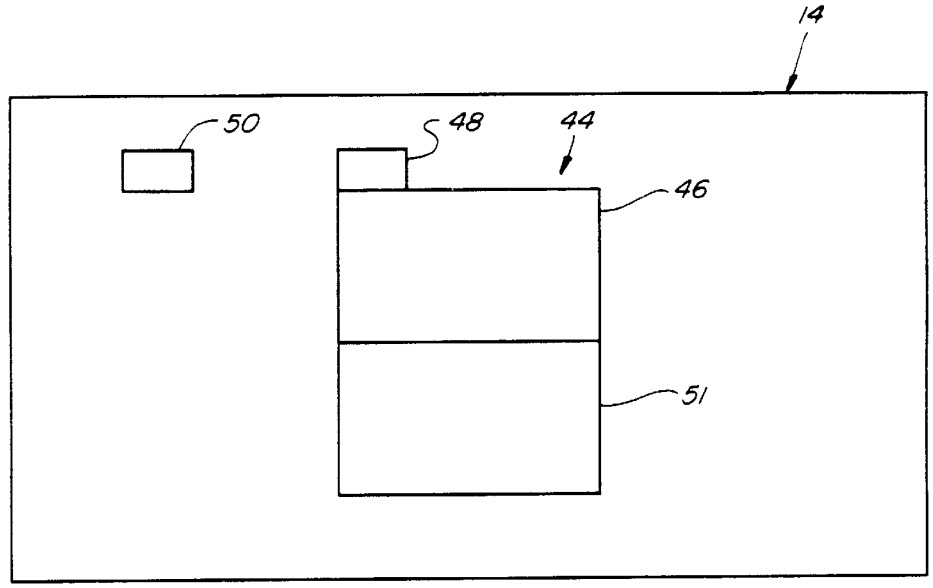
FIG. 3 is a block diagram illustration of a neural network object operable within a data space.
Figures 4, 5:
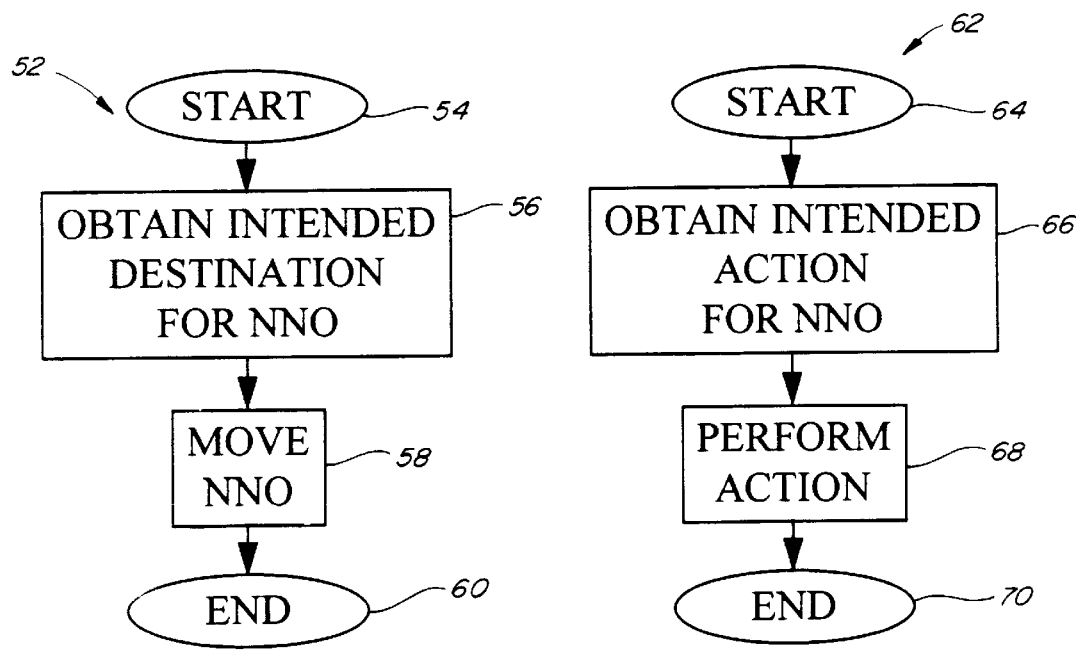
FIG. 4 is a high level flow chart for movement of the neural network object illustrated in FIG. 3.
FIG. 5 is a high level flow chart providing the neural network object of FIG. 3 with the ability to act upon the data space.

FIG. 3 illustrates the block diagram configuration of a neural network object 44 which may be operable to move within the data space 14, alter or otherwise operate on data or other objects within the data space 14, and/or self organize. The neural network object 44 includes a first data space implemented artificial neural network 46 and also includes one or more imaging cells 48 which, through relative cell referencing, form a working image of a portion 50 of the data space 14. Thus, the imaging cells 48 are tantamount to a visual or receptive field in neurobiology. The image developed by the imaging cells 48 is then input to the artificial neural network 46, again through relative cell referencing. This first artificial neural network 46 may be trained within a known knowledge domain so as to process the input data and result in some desired output. For example, the artificial neural network 46 could be trained to simulate the output of a known system, such as a materials manufacturing process or some hardware device, in response to a multi variable vector input thereto. Alternatively, the artificial neural network 46 may be an untrained network which is to be trained on the data referenced by the imaging cells 48. Of course, the neural network object 44 may also include other associated networks 51. The neural network object 44 may be operable, via a program associated therewith, to perform some task. Exemplary programming routines are illustrated in the high level flow charts of FIGS. 4 and 5. The routine 52 of FIG. 4 could be utilized to cause the neural network object 44 to move, wherein the movement is dependent upon some information produced by the neural network object 44. Staring at 54, such information would be obtained therefrom at step 56 and the movement would then be carried out by step 58, with the routine ending at 60. Similarly, the routine 62 of FIG. 5 could be utilized to delete or otherwise alter the data located in the portion 50 of the data space 14, or to self organize such as by modifying the artificial neural network 46. The intended action of the neural network object 44 would be determined, starting at 64, from information obtained therefrom at step 66. The action would then be carried out at step 68, with the program ending at 70.

Autonomy of the neural network object 44 is ensured by partitioning its internal function from any governing algorithm in a technique resembling encapsulation within object-oriented programming wherein class objects or different portions of a computer code conceal data and algorithms from each other, passing only restricted information between each other. The encapsulation feature allows for the portability of the class objects. In the present invention, the concept of encapsulation is extended to artificial neural networks wherein the activity between an algorithm and a neural network is segregated. Therefore, the neural network object 44, such as shown in FIG. 3, autonomously makes decisions based upon the imaged portion 50 of the data space 14 and the algorithm, 52 or 62, then effects those decisions.

SELF TRAINING

Figure 6:
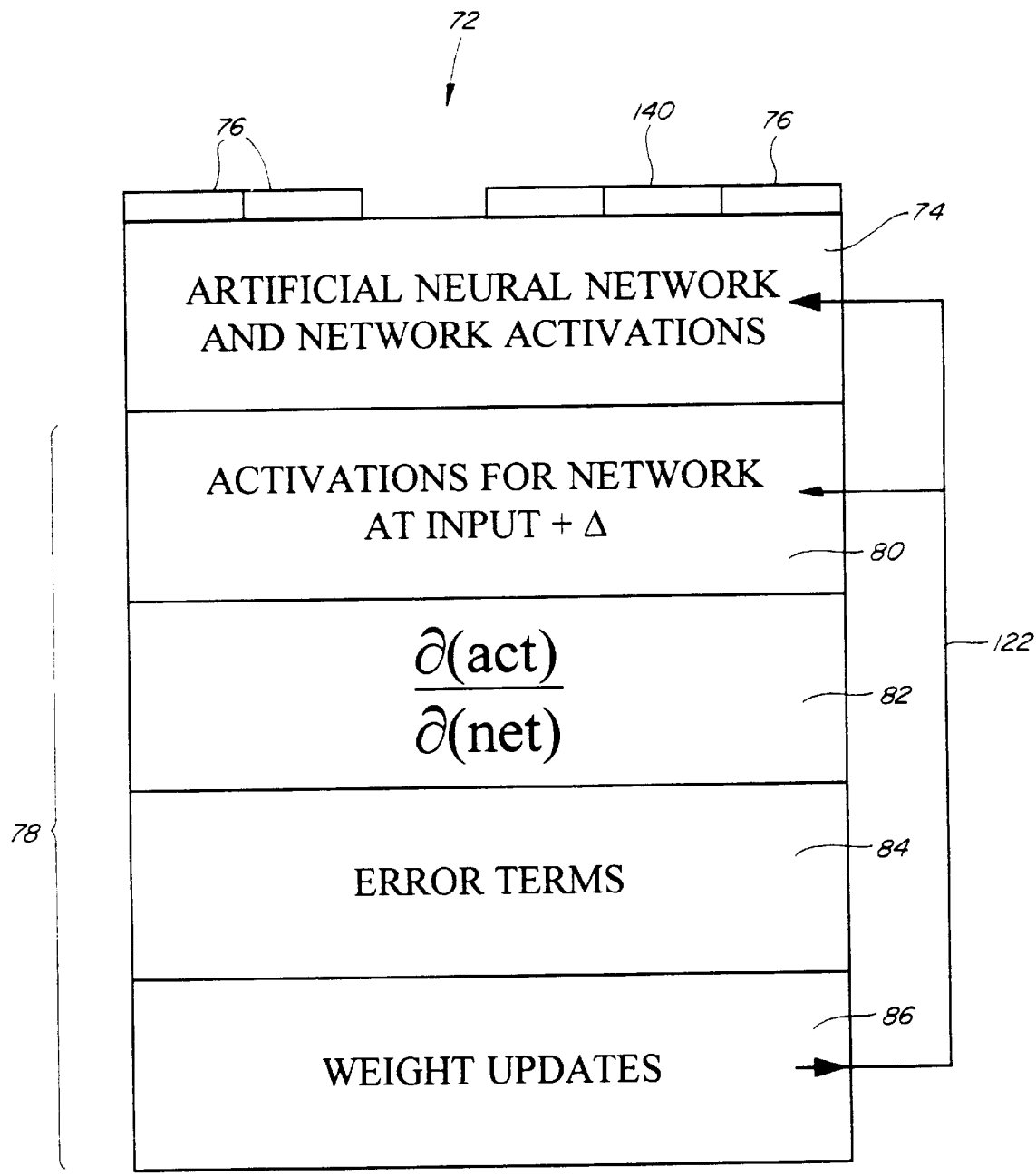
FIG. 6 is a block diagram illustration of a self training artificial neural network object which includes an artificial neural network and a training network.

Various neural network objects can be constructed in accordance with the present invention to perform various functions or simulate known systems. For example, the block diagram configuration of a self training artificial neural network object or STANNO 72 which is operable to train an artificial neural network 74 is illustrated in FIG. 6. The STANNO 72 includes a plurality of imaging cells 76, the artificial neural network 74 which is to be trained, and a training network 78. The training network 78 includes four modules, 80, 82, 84, and 86 which are configured to implement backpropagation training of the artificial neural network 74.

Figure 7:
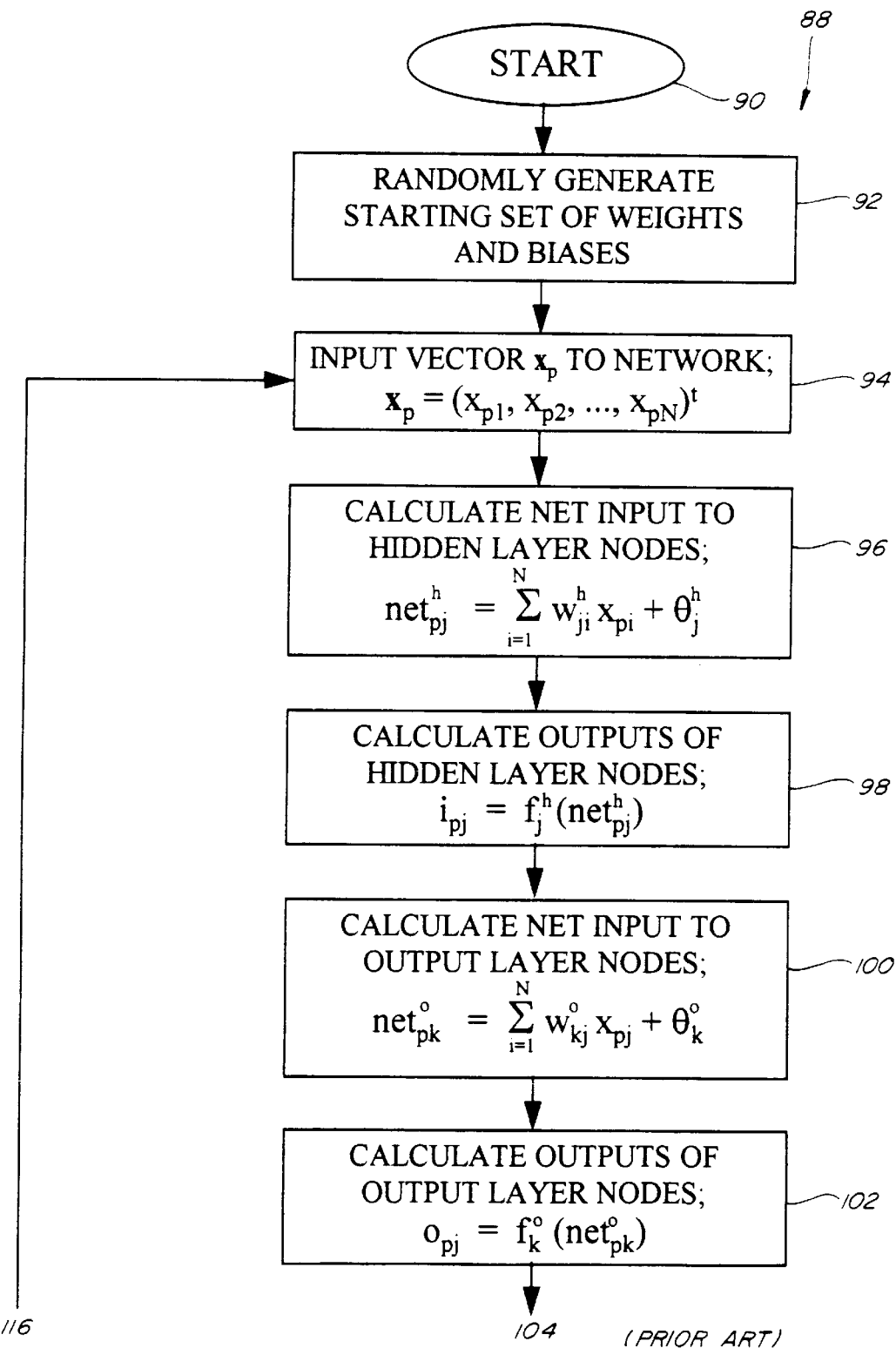
FIG. 7 is a flow chart illustration of traditional backpropagation neural network training.
Figure 8:
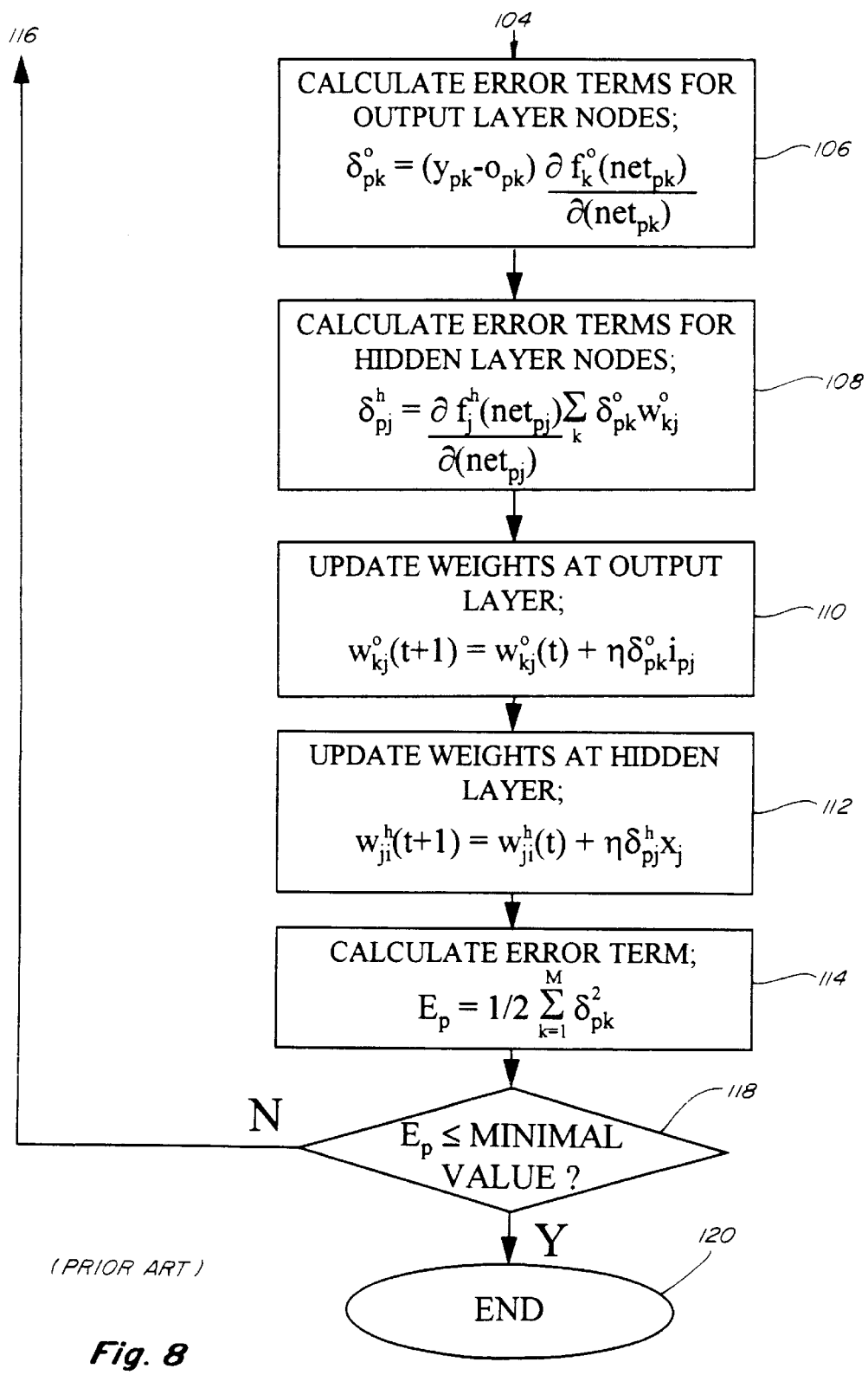
FIG. 8 is a continuation of the flow chart of FIG. 7.

The steps involved in traditional backpropagation training are illustrated in the flow chart 88 of FIGS. 7 and 8, and are summarized below. In this regard, x is defined as a multi variable vector whose components represent the individual inputs to the artificial neural network being trained; p is used as an index to signify the pth data vector presented to the neural network being trained. Accordingly a given input vector is designated $x_p$. Beginning at 90 in flow chart 88, backpropagation training includes generating a table of random numbers corresponding to a starting set of weights at step 92. An input vector, $x_p$, is then input to the randomly set neural network at step 94. The net input values to the hidden layer nodes or neurons are then calculated, wherein $net_{pj}^h$, the total input to the jth hidden (h) layer neuron is the sum of the products of all inputs, $x_{pi}$ and weights $W_{ji}^h$ plus the bias term $\theta_j^h$ as demonstrated by the equation of step 96. The outputs from the hidden layer are then calculated as demonstrated by the equation of step 98 where $i_{pj}$ represents the activation level of the jth hidden layer neuron as a function of its net input and f represents some functional relation such as a sigmoid, linear threshold function, or hyperbolic tangent. The net input values to each unit of the output layer are then calculated as demonstrated by the equation at step 100, wherein the superscript o refers to the output layer quantities. The outputs of the output layer nodes or neurons are then calculated as demonstrated by the equation at step 102. The flow chart 88 then continues at 104 in FIG. 8. The error terms for each of the output units and each of the hidden layer units are then calculated according to the equations of steps 106 and 108. Next, the weights on the output layer are updated according to the equation of step 110, and the weights on the hidden layer are then updated according to the equation of step 112, wherein η represents the learning parameter. An error term Ep is then calculated according to the equation at step 114. A new input vector is then selected and training returns to step 94, as indicated by 116, with training continuing until the error Ep reaches some minimal value, as determined at step 118. The flow chart 88 ends at 120.

Rather than performing all of the steps of flow chart 88 in sequence, the STANNO 72 of FIG. 6 utilizes the training network 78 to perform these operations in parallel fashion. The training network 78 includes first module 80 which is identical to the artificial neural network 74 except that it determines what the activation levels are when each of the inputs is increased by some infinitesimal amount, which may be represented by a value Δ of 0.01. It is understood that other values of Δ could also be utilized without departing from the scope of the present invention. The second module 82 determines the derivatives of cell activations with respect to net input to those cells. The third module 84 utilizes the derivatives to determine the error terms corresponding to steps 106 and 108 of flow chart 88. The fourth module 86 determines weight updates, and the weights of the artificial neural network 74 and the first module 80 are then adjusted, as indicated by arrow 122, using the updates produced by the training network 78. Thus, training of the artificial neural network 74 is not carried out with algorithmic code, but rather by a network training a network.

Figure 9:
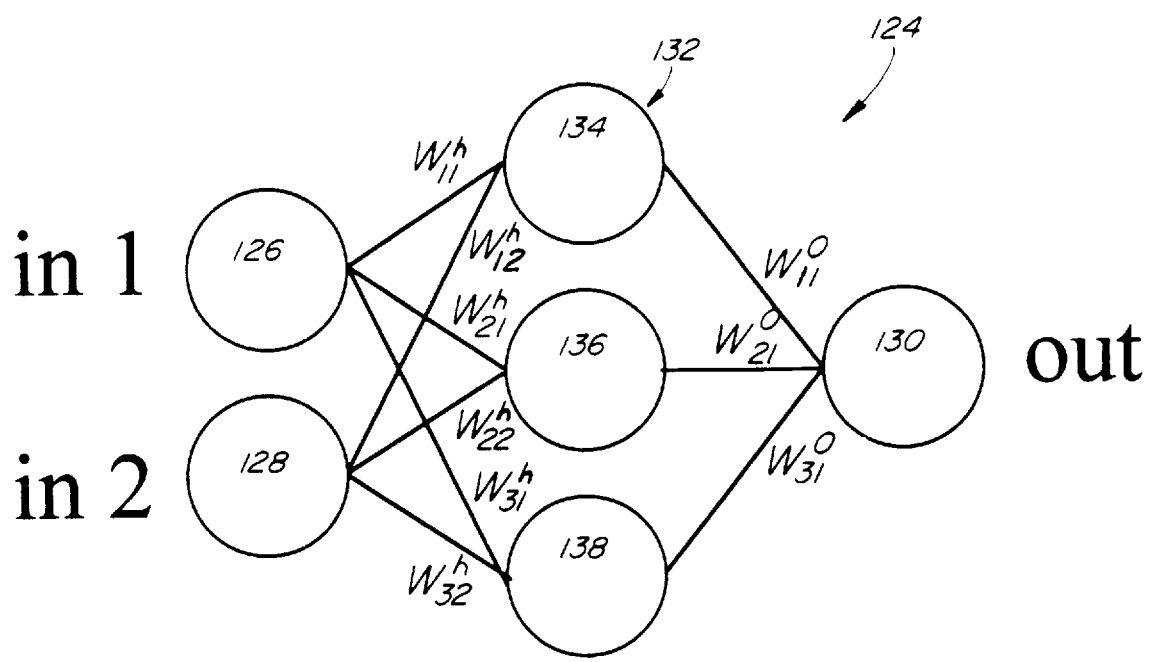
FIG. 9 is a nodal illustration of an exemplary artificial neural network which forms part of the self training artificial neural network object of FIG. 6.

FIGS. 9 through 14 illustrate in greater detail the different portions of the STANNO of FIG. 6. A traditional representation 124 of the artificial neural network 74 is illustrated in FIG. 9. A two input neuron, 126 and 128, one output neuron 130 feed forward neural network is depicted, including a hidden layer 132 having three neurons 134, 136, and 138. However, it is understood that numerous artificial neural network configurations, including more complex artificial neural networks, could be trained as described herein.

FIG. 10 illustrates a corresponding data space implementation of the artificial neural network 74. Also shown in FIG. 10 are the imaging cells 76. In relation to FIG. 9, the imaging cells D1 and E1 of FIG. 10 correspond to the input neurons 126 and 128 respectively, and activation cells F3, F4, and F5 relate to hidden layer neurons 134, 136 and 138 respectively. Cells D3 and E3 contain the weighting values and cell D4 contains the bias value for neuron 134. Similarly, cells D5, E5, and D6 contain the weight and bias values for neuron 136, while cells D7, E7, and D8 contain the weight and bias values for neuron 138. The value associated with each activation cell F3, F4, and F5 represents the activation level of respective neuron 134, 136, and 138, and is determined by a transfer function which references, either directly or indirectly, the corresponding weight and bias value containing cells as well as the imaging cells D1 and E1. Activation cell H3 of FIG. 10 corresponds to the output neuron 130 of FIG. 9 and cells G3, G4, G5, and G6 contain the weight and bias values for the neuron 130. The transfer function of activation cell H3 references, either directly or indirectly, each of the hidden layer activation cells F3, F4, and F5 as well as each of the weight and bias containing cells G3, G4, G5, and G6.

Although shown in FIG. 10, cells F6, F7, F8, and H4 are not necessary for simulating operation of the artificial neural network 74. Rather, cells F6, F7, F8 and H4 are used to determine the net input to each of the neurons 134, 136, 138, and 130, respectively, in accordance with steps 96 and 100 of flow chart 88, see FIG. 7. These determined values are then utilized by the training network 78, see FIG. 6, as indicated below. Alternatively, the SUMPRODUCT functions within cells F6, F7, F8, and H4 could be directly incorporated in the respective transfer functions of cells F3, F4, F5, and H3.

Figure 12:
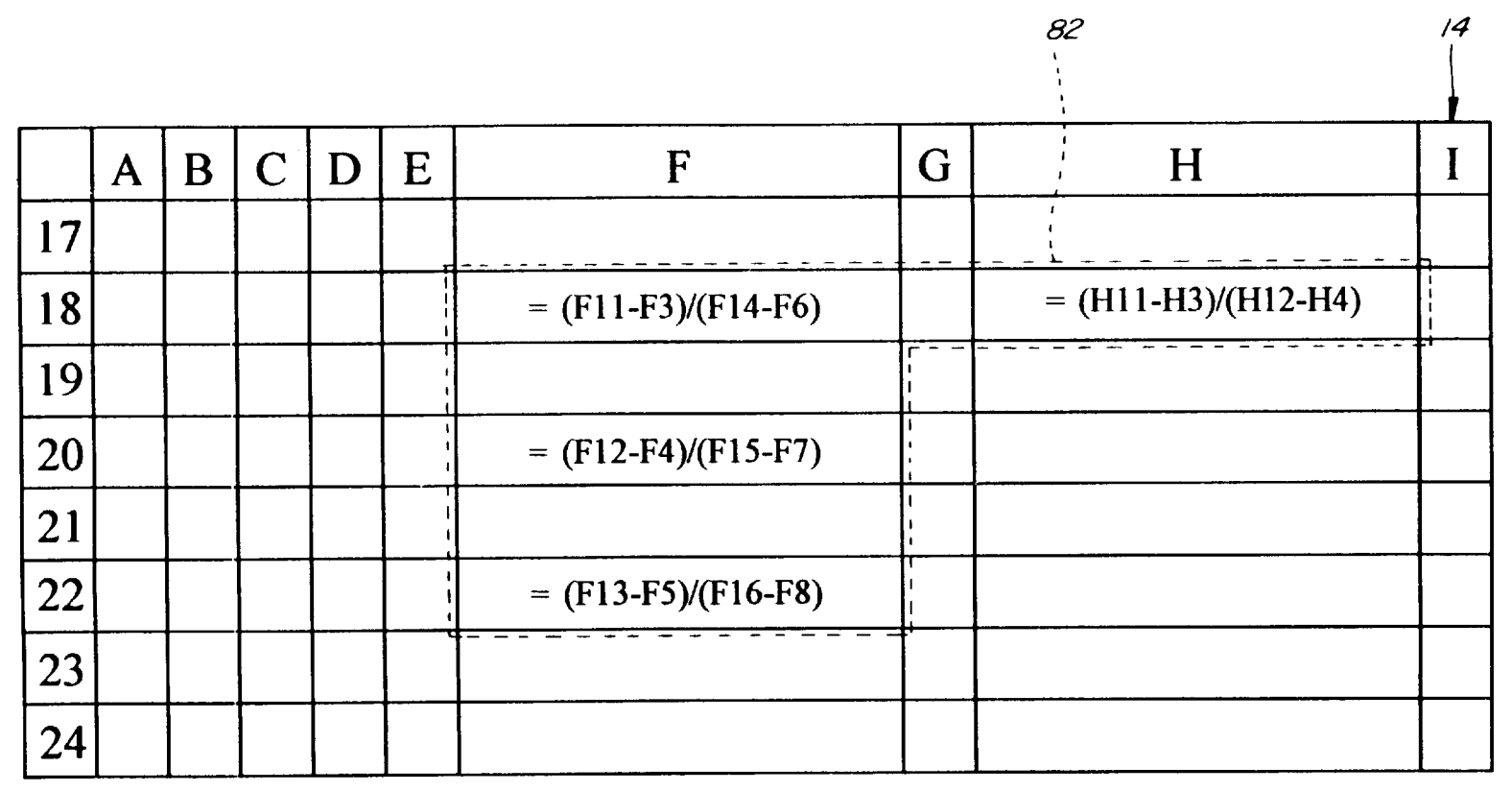

The first module 80 of the training network 78 is illustrated in FIG. 11. It is evident that, similar to FIG. 10, the first module 80 contains the data space implementation of the artificial neural network 74 illustrated in FIG. 9. However, during training, the inputs to the first module 80 are increased by some infinitesimal amount Δ, as indicated by cells D9 and E9, in order to determine the effect on the activation level of, as well as the net input to, each of the hidden layer neurons 134, 136, and 138 and the output neuron 130 of the artificial neural network 74. The values determined in the first module 80 are then utilized by the second module 82 which is illustrated in FIG. 12 and is operable to determine the derivative of cell activations, which represent neuron activations, with respect to net inputs thereto. The derivatives are approximated according to the equations in cells F18, F20, F22, and H18, which represent the difference in activation value over the difference in net input. For example, cell F18 approximates the derivative of the hidden layer neuron 134, FIG. 9, with respect to the net input thereto by dividing the difference between the numeric value associated with cell F11 and the numeric value associated with cell F3 by the difference between the numeric value associated with cell F14 and the numeric value associated with cell F6. Similar derivatives for the remaining hidden layer neurons 136 and 138 as well as the output neuron 130 are determined at cells F20, F22, and H18 respectively.

Figure 13:
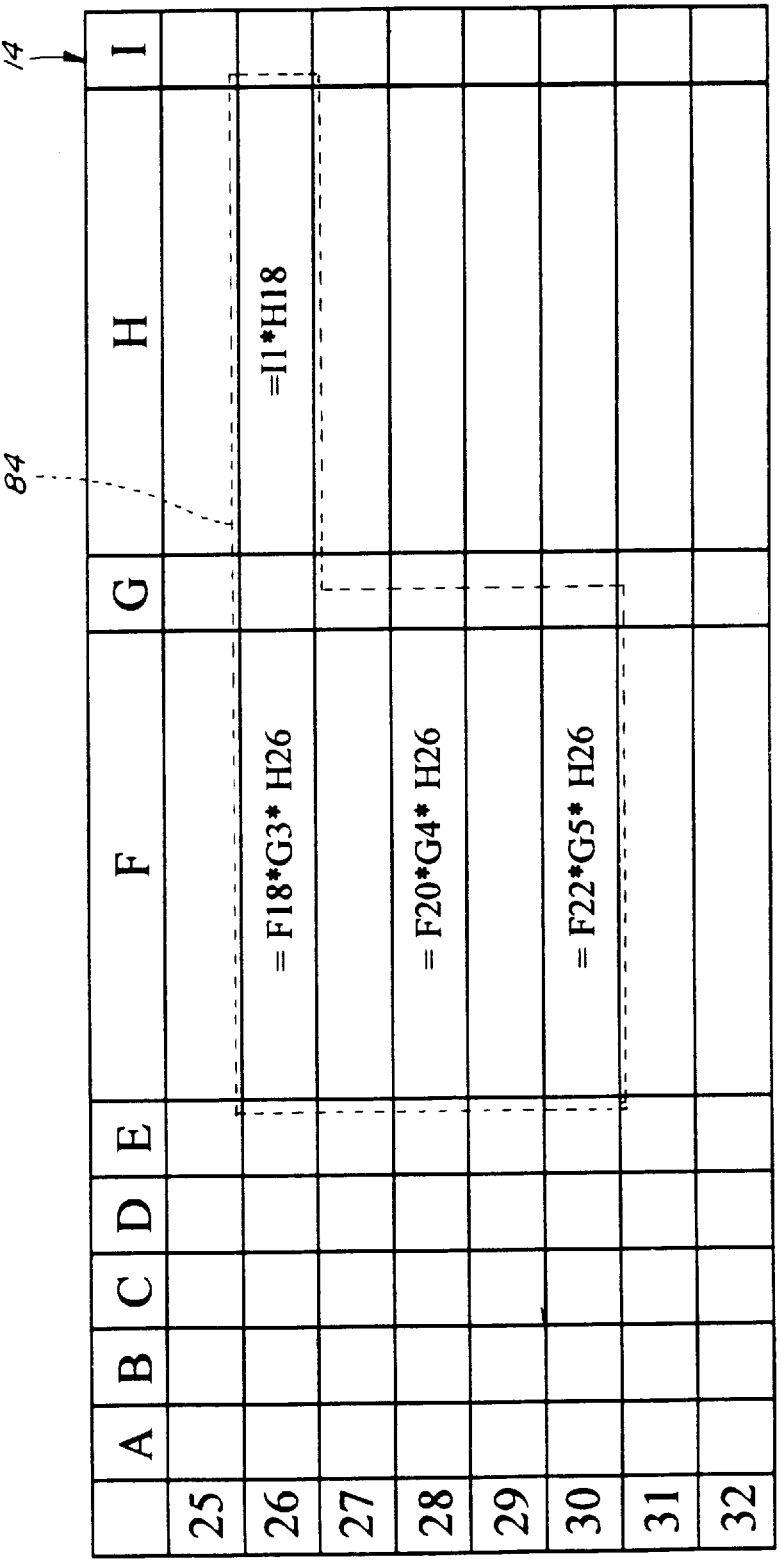
FIG. 13 illustrates a third module of the training network associated with FIG. 6, the third module operable to determine error terms.

FIG. 13 illustrates the third module 84 of the training network 78 wherein the error terms corresponding to steps 106 and 108 of flow chart 88 are determined. In cell H26 the error term $\delta_{pk}^{o}$, is determined by multiplying the value associated with cell I1 by the value associated with cell H18, the value associated with cell I1 being the difference between the actual output of the artificial neural network 74 and the desired output and the value associated with cell H18 being the derivative value determined in the second module 82. The $\delta_{pk}^{o}$ term of cell H26 is then backpropagated to determine the error terms for the hidden layer neurons 134, 136, and 138 in each of cells F26, F28 and F30. For example, in cell F26 the value of cells F18, G3 and H26 are multiplied together, the value associated with cell F18 being the derivative value determined in the second module 82 and the value associated with cell G3 being the weight term from hidden layer neuron 134 to output neuron 130. Similarly, in cells F28 and F30, the error terms for respective hidden layer neurons 136 and 138 are determined.

In the fourth module 86, shown in FIG. 14, weight update terms are determined. With respect to the output neuron 130, the weight update terms correspond to the $(\eta \delta_{pk}^{o} i_{pj})$ portion of the equation shown in step 110 of flow chart 88, where the learning parameter η has a value of one (1). For example, in cell G34 the weight update term for the weight value associated with cell G3 of FIG. 10 is determined by multiplying the numeric value associated with cell H26 by the numeric value associated with cell F3, the value associated with cell H26 being the $\delta_{pk}^{o}$ term and the value associated with cell F3 representing the $i_{pj}$ term which is the input to output neuron 130 coming from the hidden layer neuron 134. Similarly, the respective weight update terms for the weight values associated with cells G4 and G5 of FIG. 10 are determined in cells G35 and G36. In cell G37, the weight update term for the bias value is determined, the $i_{pj}$ term being designated as one (1) as explicitly shown.

The weight update terms for the hidden layer weights and biases are also determined in the fourth module 86. These weight update terms correspond to the $(\eta \delta_{pj}^{h} x_{i})$ portion of the equation shown in step 112 of flow chart 88, where η, the learning parameter, is again given a value of one (1). For example, cell D34 determines the weight update term for cell D3 of FIG. 10 by multiplying the numeric value associated with cell F26 by the numeric value associated with cell D1, the value associated with cell F26 being the $\delta_{pj}^{h}$ term determined in the third module 84 and the value associated with cell D1 being the input value to the hidden layer neuron 134. Similarly, cells E34, D35, D36, E36, D37, D38, E38 and D39 determine the weight update terms for each of the values in respective cells E3, D4, D5, E5, D6, D7, E7, and D8, of FIG. 10. Importantly, the training network 78 determines all weight updates from observed errors, utilizing a parallel computation scheme built upon the backpropagation paradigm. There are no algorithmic sequences of steps constituting the partial derivatives, error terms, and updates.

Figure 15:
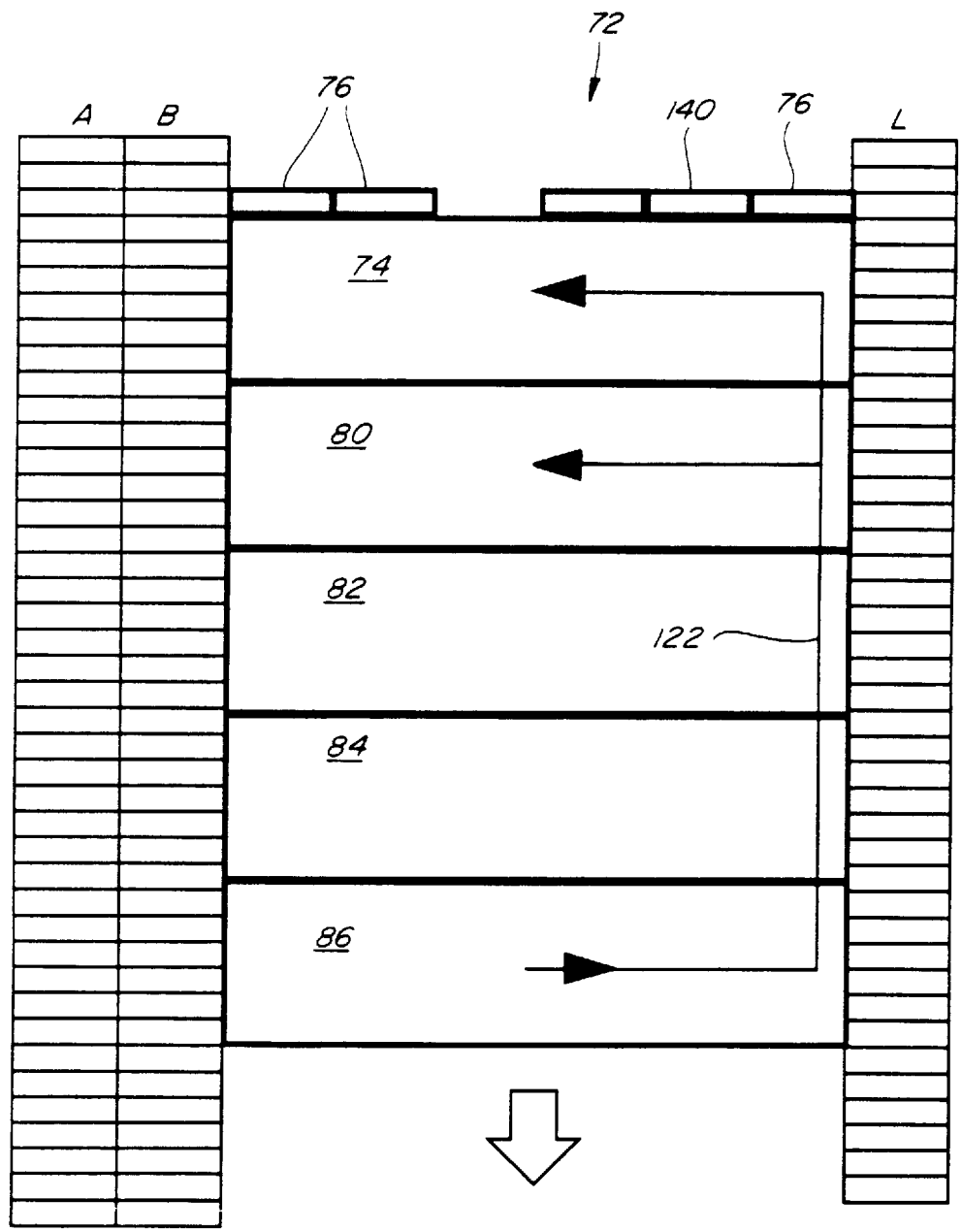
FIG. 15 illustrates the self training artificial neural network of FIG. 6 as it moves through and trains within the data space.

The weight update terms determined in the fourth module 86 must then be added to their corresponding weight terms in the artificial neural network 74 and the first module 80. After updating the weight terms, the STANNO 72 is operable to move to another location in order to train on another set of data within the data space 14. The operation of the STANNO 72 is best shown in FIG. 15 where the STANNO 72 is shown in block diagram form. Multiple sets of training data may be located in columns A, B, and L of the data space, with columns A and B containing the inputs and column L containing the corresponding desired output. After training on a set or row of data, the STANNO 72 is operable to move down one row and train on another set of data. Thus, the STANNO 72 moves through and therefore trains on the training data, with the error or difference between actual output of the artificial neural network 74 and the desired output in column L decreasing accordingly, and displayed at cell 140.

Movement of the STANNO 72 and updating of the weight values of the artificial neural network 74 are achieved via software such as the Visual Basic program 142 shown in FIG. 16. The program may be located in a separate spreadsheet, not shown, which is associated with the spreadsheet or data space 14 of the STANNO 72. In program portion 144, the last training data point, lasti, and the Epoch value are recovered from the spreadsheet. The program portion 146 randomly assigns initial weights between –8 and 8 to the weight cells of the artificial neural network 74. In each of the terms "Cells(x, y)" the x value corresponds to a row within the data space and the y value corresponds to a column with the data space. Alternatively, weights may be initialized by placing the spreadsheet function rand ( ) within the appropriate cell and calling a calculate command.

In program portion 148 artificial neural network training takes place, with the Epoch value representing the number of times the STANNO 72 will be permitted to train on the training data, and the i value representing the number of rows or sets of data the STANNO 72 will be permitted to train on. The calculate term 150 triggers all calculations within the data space 14. Then update lines 152 update the weight cells by adding to them the weight update values determined in the fourth module 86 of the training network 78. After the weight values have been updated, program portion 154 determines if the STANNO 72 has reached the end of the training data, as indicated by zero (0) values in the training input columns. Program portion 156 causes the STANNO 72 to move down one row within the data space 14. After moving to the bottom of the i sets of data program portion 158 operates to move the STANNO 72 back up to the top of the training data. The movement of the STANNO 72 is accomplished by the copy and paste commands, which leave behind a diagnostic trail of network inputs and outputs. Cutting and pasting would erase this trail. Training will be completed when the STANNO 72 has moved through the training data a predetermined number of times, which in this case is the upper limit of the Epoch value, or 1000. Alternatively, training could continue until the RMS error associated with the artificial neural network falls below some predetermined value.

It should be understood that the STANNO 72, illustrated in FIGS. 6 and 10–15 along with associated program 142 is merely one configuration among many possibilities for self training neural network objects. The important aspect of the invention being a network which trains a network.

In this regard, FIGS. 17 through 21 illustrate an alternative configuration for an integrated self training artificial neural network where the artificial neural network being trained and the associated training network are integrated with each other in the data space. FIGS. 17 through 21 all refer to different portions of the same data space 14, and FIG. 17 particularly illustrates columns A through S of the data space 14. Columns B through S contain multiple sets of training data, one set per row, where the sets include nine (9) inputs 160, designated xp1 through xp9, and nine (9) associated outputs 160, designated yp1 through yp9. Although only nine rows or sets of training data are shown, the number of sets of training data is limited only by the maximum number of rows allowable in the data space 14. Further, in the case of a dynamic data exchange as described below, the number of sets of training data is unlimited.

With regard to the integrated self training artificial neural network, FIGS. 18 through 21 illustrate portions thereof. It is assumed that the artificial neural network being trained is a 9-9-9 network, having nine inputs, nine hidden layer neurons, and nine output layer neurons. FIG. 18 illustrates columns AK through BB of the data space 14, which columns are utilized to determine the maximum and minimum numeric values contained within each column of the training data illustrated in FIG. 17, as shown in rows one (1) and two (2). In row three (3), the difference between the maximum and minimum values is determined.

In FIGS. 19 through 21, the configuration for two levels of neurons is illustrated, rows three (3) through twelve (12) representing the first level 164 and rows thirteen (13) through twenty-two (22) representing the second level 166. Seven more levels of neurons are included in a complete configuration, but, for ease of understanding, are not shown.

With reference to column U of FIG. 19, it is seen that the values determined in FIG. 18 are utilized to normalize the training inputs. Within column U, cells U3 through U11 determine the normalization of each input, thus the cell combination U3 through U11 represents the input vector. Cells U13 through U21 similarly represent the same input vector for the second level. In column V, the delta value, 0.01 or –0.01, is added to the normalized inputs of column U. In this regard, because the transfer function being utilized, a sigmoid, has a linear region around the value 0.5, it is desirous when adding the delta value to the normalized input to adjust the input towards the linear region. Thus, in cell V3, the function=IF(U3<0.5, U3+0.01, U3–0.01), causes the positive delta value to be added to normalized inputs which are less than 0.5 and causes the negative delta value to be added to normalized inputs which are greater than 0.5. Again, for the second neuron level 166, similar values are used as indicated by the relative references of cells V13 through V21. The cells of column W contain the hidden layer weight values wji, where j represents the neuron level and i represents the input associated therewith, with biases given the designation q as shown in cells W12 and W22. The training based updated hidden layer weight values are determined in the cells of column X.

Referring to FIG. 20, in column Y the activation levels and derivatives of activation level with respect to net input thereto are determined for each hidden layer neuron level. With respect to the first level 164, the activation level and net input for the normalized inputs of column U are determined in cell Y3 and Y4, respectively, the activation level and net input for the delta adjusted inputs of column V are determined in cells Y5 and Y6, respectively, and the derivative value is determined in cell Y7. Corresponding values for the second level 166 are determined in cells Y13 through Y17. Following this pattern, each of cells Y3, Y13, Y23, Y33, Y43, Y53, Y63, Y73, Y83 will contain the activation level of a hidden layer neuron. Thus, in column Z, all activation levels, act j(xp), are relatively referenced such that, for example, the values associated with cells Z3 through Z11 represent an input vector to be applied to the output layer neurons. Accordingly, in column AA, the delta value is added to the activation levels of column Z. Column AB contains the output layer weight values wkj and the training based updated output layer weight values are determined in column AC.

Referring to FIG. 21, the activation levels and derivatives of activation level with respect to net input thereto are determined in column AD for each output layer neuron. The actual activation levels, which represent output values, are then relatively referenced in column AE, cells AE3 through AE 11. In column AG, these actual output values are compared with the desired output values which are associated with column AF and which, although not shown, are normalized as were the inputs. Accordingly, in cell AG12 an rms error value is determined. In column AH the $\delta_{pk}^o$ terms are determined and in column AI a $\delta_{pk}^o$ vector term is developed, as represented by cells AI3 through AI11. With reference to column AC of FIG. 20, it is seen that the $\delta_{pk}^o$ terms determined in column AI are utilized to determine the output layer weight update terms, wkj. Similarly, with reference to column X FIG. 19, it is seen that $\delta_{pk}^o$ terms are also backpropagated to determine the hidden layer weight update terms, wji.

Thus, with each calculate command initiated within the data space, all necessary calculations for backpropagation training take place. After each calculation, the weight values in columns W and AB must be replaced with their corresponding updated weight values associated with columns X and AC, respectively. FIG. 22 illustrates a subroutine 168 which accomplishes this task. In the subroutine 168, with regard to the hidden layer weights, the first line selects the cells of column X associated with the integrated self training artificial neural network and the second line copies those cells. The third line selects the destination column for the copied material and the fourth and fifth lines operate to paste only the numeric values associated with the copied cells into the destination column. Similarly, the sixth through eleventh lines of subroutine 168 operate to replace the output layer weight values of column AB with the updated weight values of column AC. As compared to the update method illustrated in portion 152 of FIG. 16, the subroutine 168 is able to complete the weight updating much more quickly, advantageously increasing training speed.

Utilizing a dynamic data exchange provided by a product such as National Instruments Measure for Windows, which is operable with Microsoft Excel, the integrated self training artificial neural network illustrated in FIGS. 18 through 21, is capable of training in real time as training data flows through the data space 14. In such a case, the data would flow through predetermined rows or columns and the integrated self training artificial neural network would remain stationary in the data space 14 while the training data moves relative thereto. Of course, the STANNO 72 illustrated in FIGS. 10 through 14 could also be utilized with such a dynamic data exchange.

Figure 23:
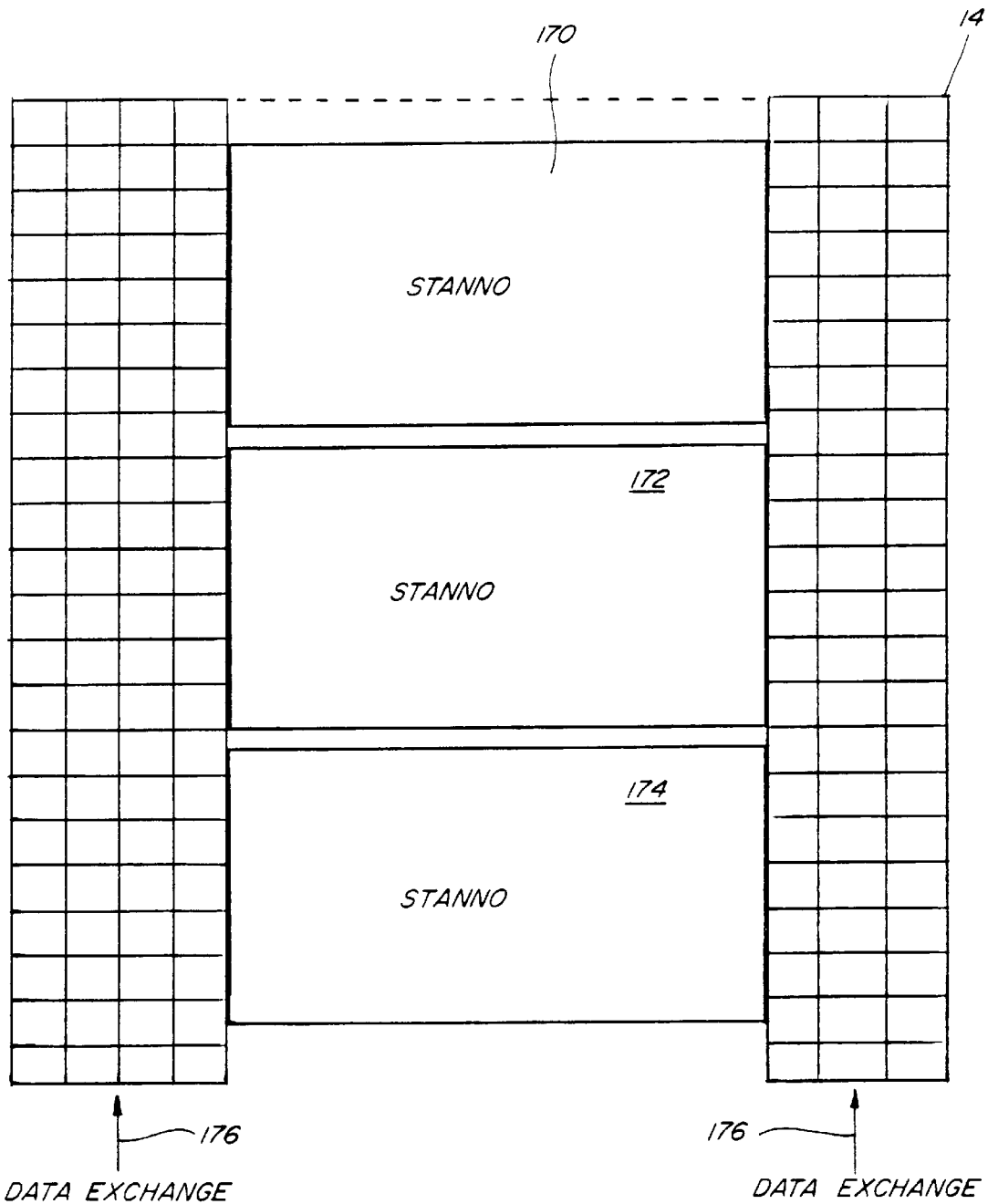
FIG. 23 illustrates a plurality of self training artificial neural network objects training simultaneously within a data space.

Another advantage of self training artificial neural networks is that multiple networks may be trained simultaneously, in parallel fashion, on the same, or different, sets of training data. Referring to FIG. 23, for example, in the case of a dynamic data exchange, multiple self training artificial neural network objects such as 170, 172, and 174, may be positioned within the data space 14 so as to train on the data flowing through the columns as indicated at 176. Each self trainer 170, 172, and 174, may also be configured to train on only some of the columns of data in order to result in trained networks having different knowledge domains. Further, each self trainer could train on completely different sets of data, such as where STANNO 170 trains on the data flowing through the columns to the left and STANNO 172 trains on the data flowing through the columns to the right, or where multiple self training neural network objects train on distinct data within separate spreadsheets altogether. Such a parallel training scheme would be extremely difficult to implement using traditional algorithm based training. Further, training multiple networks simultaneously results in substantial savings in training time.

Still other advanced features can be incorporated into the training schemes of self training artificial neural network objects. Two such features are dynamic pruning of networks during training and dynamic addition of neurons during training.

Figure 24:
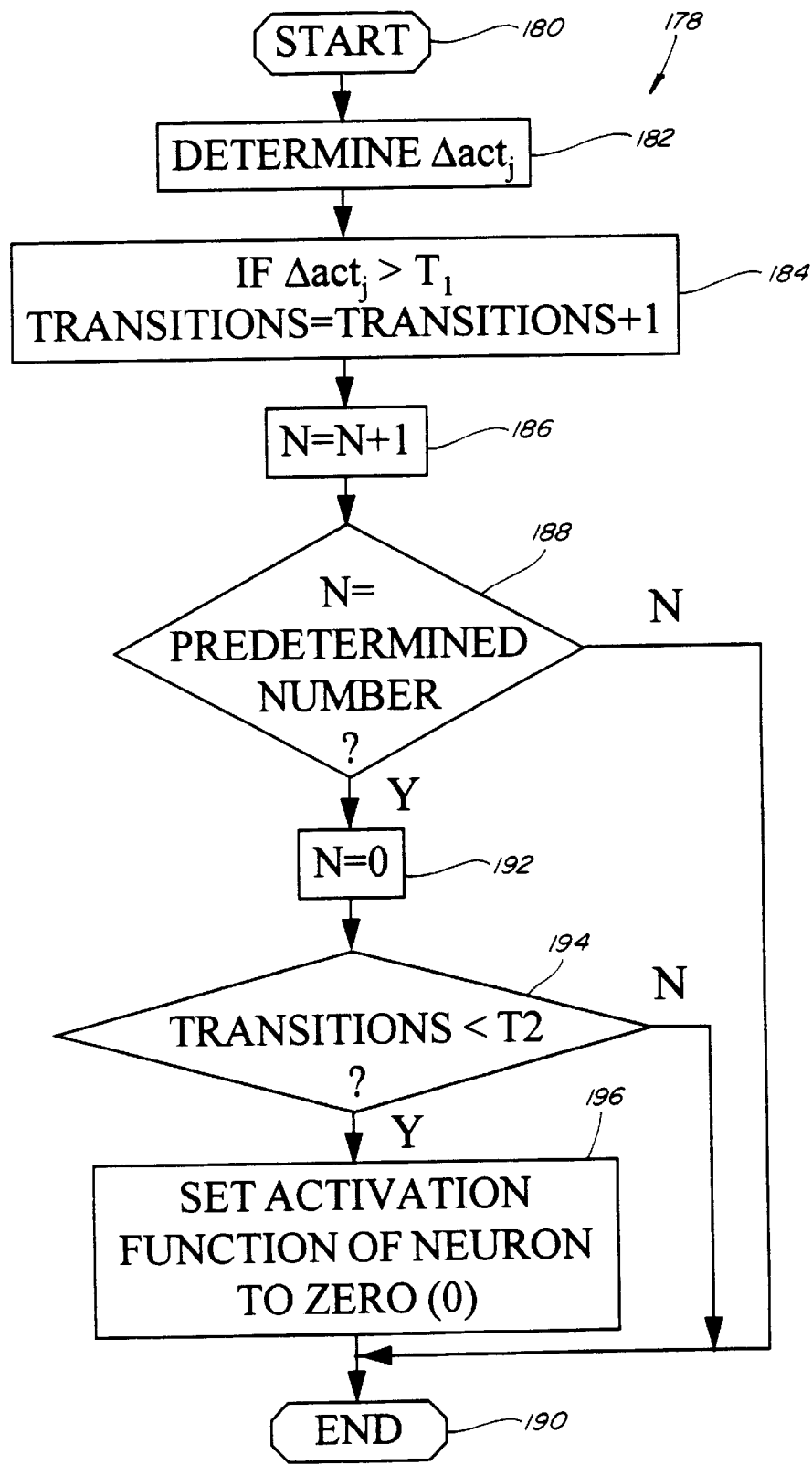
FIG. 24 illustrates a subroutine flow chart for implementing dynamic pruning in association with self training artificial neural network objects.

With regard to dynamic pruning, for each neuron of the artificial neural network associated with the self training artificial neural network object, a subroutine 178 such as illustrated in FIG. 24 may be provided, such as by embedding the subroutine 178 within the spreadsheet or data space. Within this subroutine 178, the variable N may be a count of the number of sets of training data which have been operated upon and which is set to zero (0) at the beginning of training, T1 may be a predetermined value which is chosen to represent a change in magnitude associated with the activation level of the neuron, and T2 may be a predetermined number which is chosen to represent a number of activation level changes of magnitude greater than T1. The subroutine 178 is run in association with each wave of spreadsheet calculation. The subroutine starts at 180 and at step 182 the change in activation level, $\Delta_{act}$, of the neuron is determined. At step 184, if the change in activation is greater than T1, the variable TRANSITIONS is increased by one. Moving to step 186, the N count, or count of number of sets of training data, is increased by one and at step 188 the N count is evaluated to see if it has reached a PREDETERMINED NUMBER. If N has not reached the PREDETERMINED NUMBER, the subroutine ends at 190.However, if the N count has reached the PREDETERMINED NUMBER, step 192 is reached and the N count is again set to zero. At step 192 the TRANSITIONS variable is evaluated to see if it is less than the number T2, if not, the subroutine 178 ends at 190. However, if TRANSITIONS is less than T2, the activation function of the neuron is set to zero (0) at step 196, effectively eliminating the neuron from having any further effect. Thus, T1 and T2 can be chosen to reflect the fact that the neuron is not significantly involved in the training regime and can therefore be pruned out of the artificial neural network, while the PREDETERMINED NUMBER of step 188 can be chosen to reflect how often the neuron should be evaluated to see if it should be eliminated.

Figure 25:
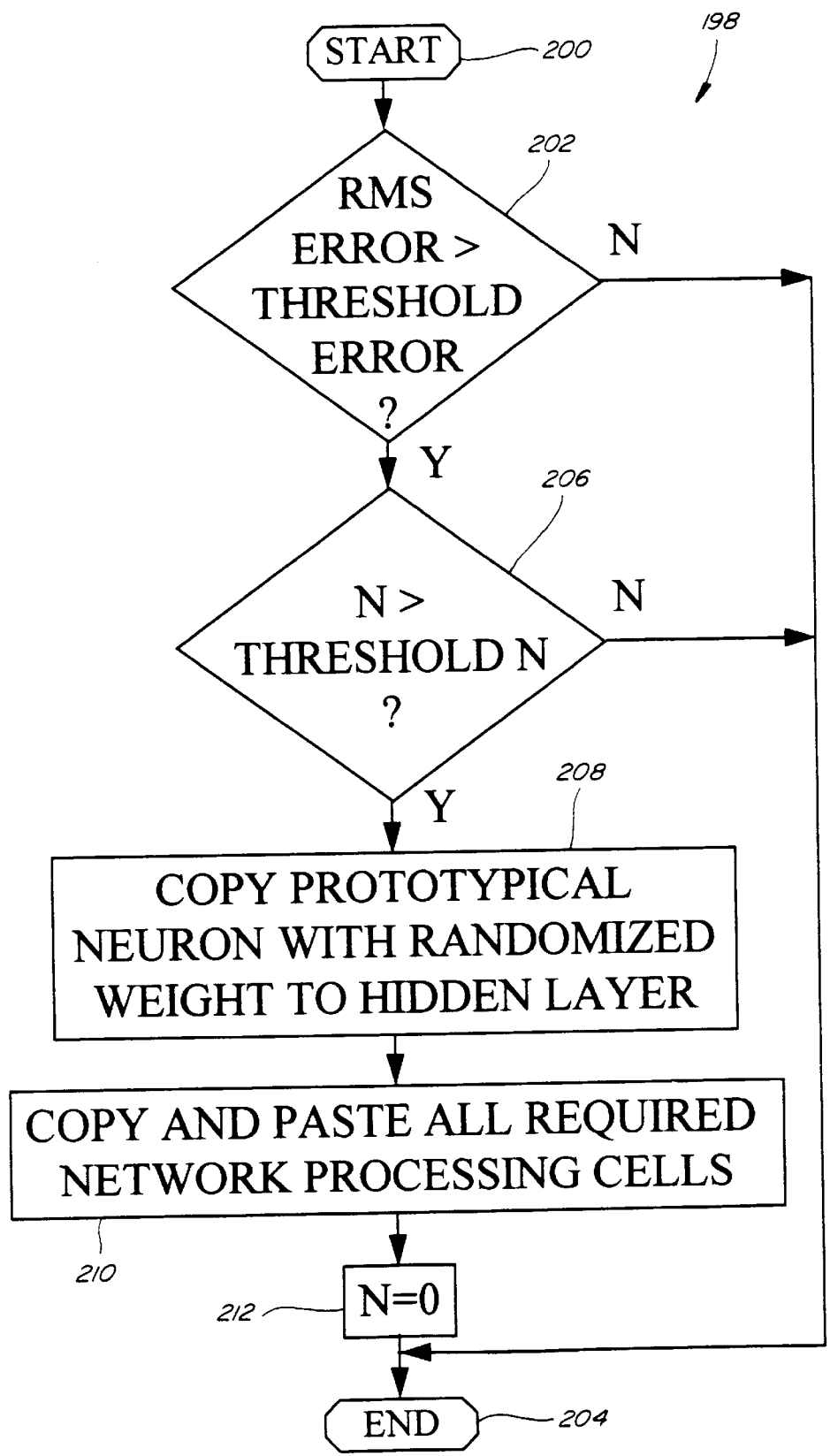
FIG. 25 illustrates a subroutine flow chart for implementing dynamic addition of neurons in association with self training artificial neural network objects.

With regard to dynamic addition of a neuron or neurons, a subroutine 198, illustrated in FIG. 25, may be associated with the operation of a self training neural network object. The subroutine 198 begins at 200 and at step 202, the RMS ERROR between actual outputs and desired or training outputs, determined after each set of training data is operated upon, is evaluated to determine if it exceeds a desired THRESHOLD ERROR, which is predetermined so as to be indicative of successful incorporation of the desired knowledge domain within the artificial neural network. If the RMS ERROR has fallen below the THRESHOLD ERROR, the subroutine 198 ends at step 204. Conversely, if the RMS ERROR exceeds the THRESHOLD ERROR, step 206 is reached where N, the count of sets of training data, is evaluated to determine if it exceeds a THRESHOLD N number. If N does not exceed the THRESHOLD N number, the subroutine 198 ends at step 204. However, if N exceeds the THRESHOLD N number, step 208 is reached. The THRESHOLD N number should be chosen so as to indicate that the training operation has continued long enough to determine that the artificial neural network being trained is not large enough, and that in order to train the artificial neural network to be able to achieve the desired THRESHOLD ERROR, the artificial neural network must be enlarged. Thus, at step 208, a prototypical neuron with randomized weights is copied and added to the hidden layer. Similarly, at step 210, all cells necessary to perform the required operations associated with the new neuron are also copied and added to the network. The N value is then reset to zero (0) at step 212 and the subroutine 198 ends at 204. After the addition of the neuron as provided by steps 208 and 210, the training operation will continue except that the artificial neural network being trained will include one additional hidden layer neuron which should enable further reduction in the RMS error. For example, in the case of the 9-9-9 network associated with the integrated self training artificial neural network of FIGS. 18–21, steps 208 and 210 of the subroutine will result in a 9-10-9 network.

Thus, as described above, both dynamic pruning and dynamic growth may be achieved in combination with self training artificial neural networks. It is understood that the routines described herein are merely exemplary of implementations of dynamic pruning and dynamic neuron addition, and that such features may be incorporated in alternative ways.

DEVICE PROTOTYPING

Figure 26:
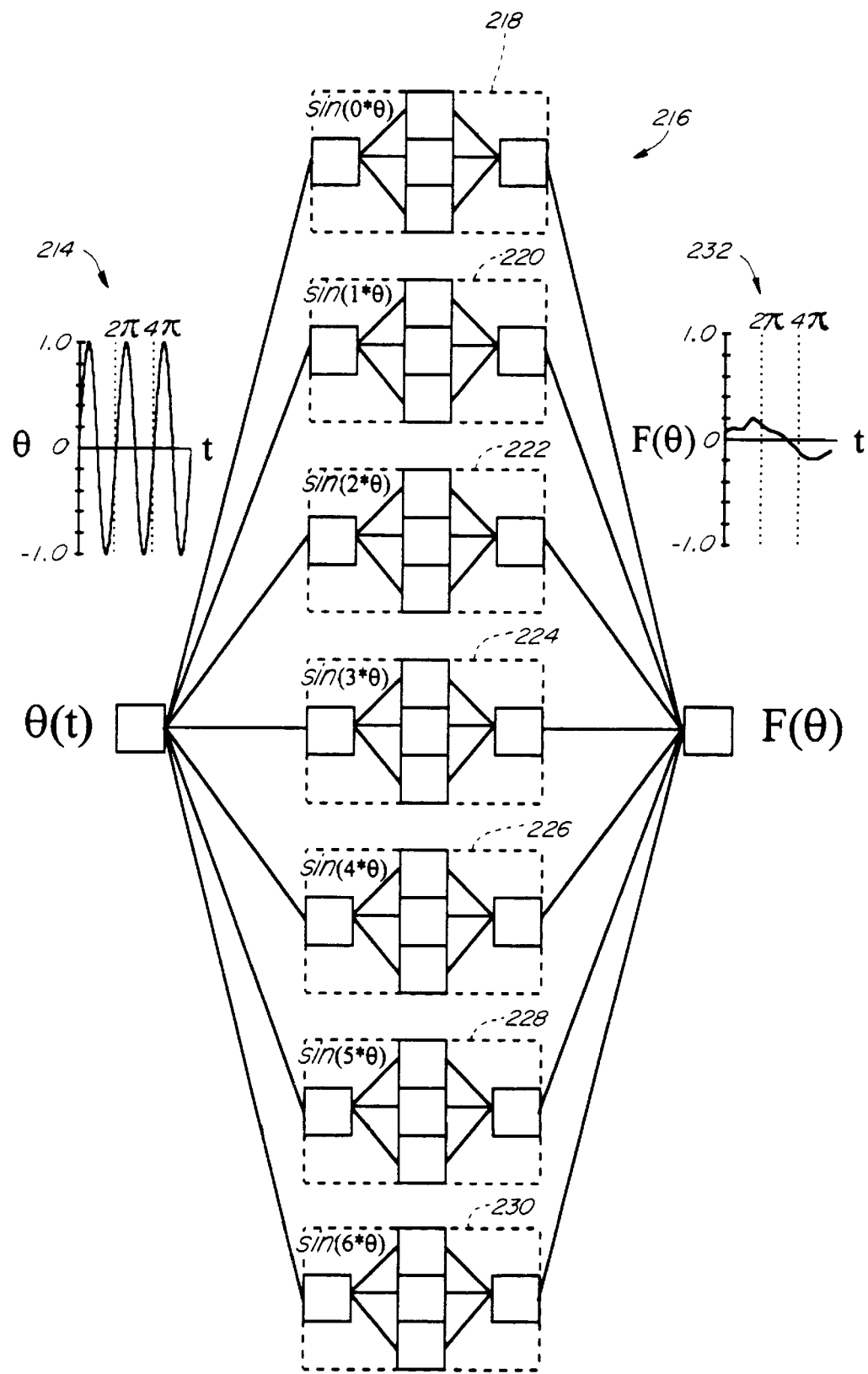
FIG. 26 illustrates an exemplary untrained device prototyping neural network.
Figure 27:
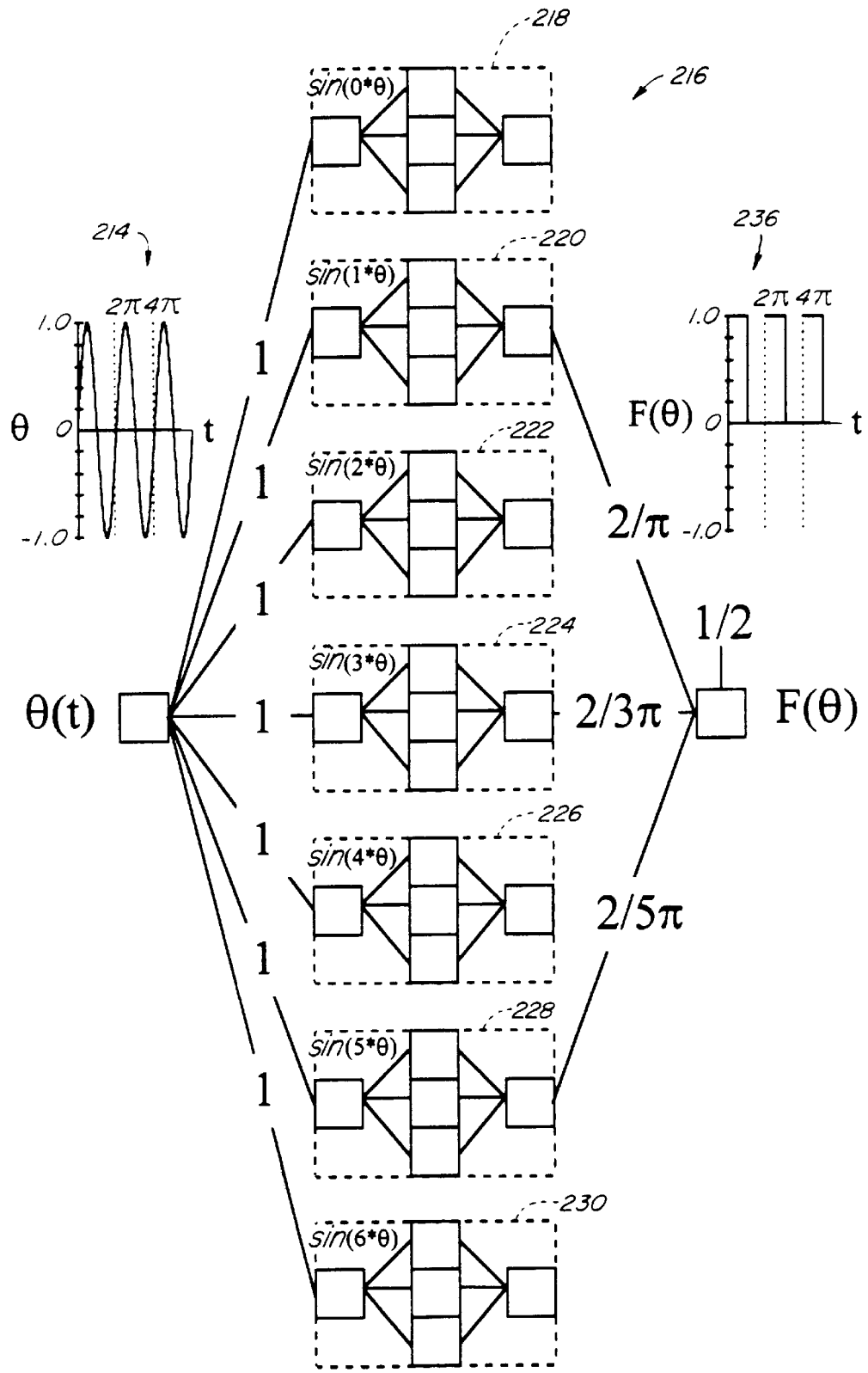
FIG. 27 illustrates the device prototyping neural network of FIG. 26 after training, including finalized weight values.

A system for device prototyping is advantageously provided in light of the ease of cascadability and the self training capability described above. An exemplary case of device prototyping is illustrated in FIGS. 26 and 27. In FIG. 26, a known input θ(t), which is a sinusoid 214 is shown. The desired output of the prototyped device, in response to the known input sinusoid 214, is a cyclic square pulse and the prototyped device is to be constructed from seven harmonic generating devices. Of course, such a problem may be approached through Fourier analysis, but it can also be solved through use of a prototyping neural network 216. The prototyping neural network 216 includes seven (7) hidden layer neurons 218, 220, 222, 224, 226, 228, and 230 respectively. Each hidden layer neuron is represented by a component neural network which is trained within a knowledge domain of one of the harmonic generating devices which will be used as components from which to construct the prototyped device. When the weights associated with the prototyping neural network are randomly assigned, the output F(θ) may appear as 232. Utilizing the techniques described above with reference to self training artificial neural network objects, the prototyping neural network can be trained within the desired knowledge domain of the prototyped device, which is reflected in a conversion of the sinusoid 214 to a cyclic square pulse.

FIG. 27 illustrates the resulting prototyping neural network 216 after training, including weight values. As seen, all hidden layer weights approach one. With regard to the output layer weights, the weights for neurons 218, 222, 226, and 230 approach zero, and thus no connection to the output is shown. However, the illustrated weights for neurons 220, 224, and 228 approach (2/π), (2/3π), and (2/5π) respectively, along with a bias value of (1/2). With these weight values, the resulting output of the prototyping neural network is F(θ) as shown in the equation 234 and the graph 236. The weights which result from training the device prototyping neural network can then be correlated to how the components should be interconnected in order to construct the prototyped device. In this exemplary case, it is evident that odd harmonic generating devices would be directly connected to the input θ(t) and that the outputs therefrom would be multiplied by the respective weights and summed in order to construct the prototyped device.

This prototyping system can be utilized in conjunction with many types of components. The important aspect of the system is that if a neural network model for each component can be constructed, a prototyping neural network can be trained without requiring explicit knowledge of the functional relation between inputs and outputs of the components because the self training scheme is able to determine derivative values without knowing the functional relation. On the contrary, traditional backpropagation algorithms require foreknowledge of the functional relation and its derivative. Thus, combining the cascadability of neural networks implemented in spreadsheets with the self training artificial neural network facilitates the aforementioned device prototyping system.

DATA FILTERING/MONITORING

Figure 28:
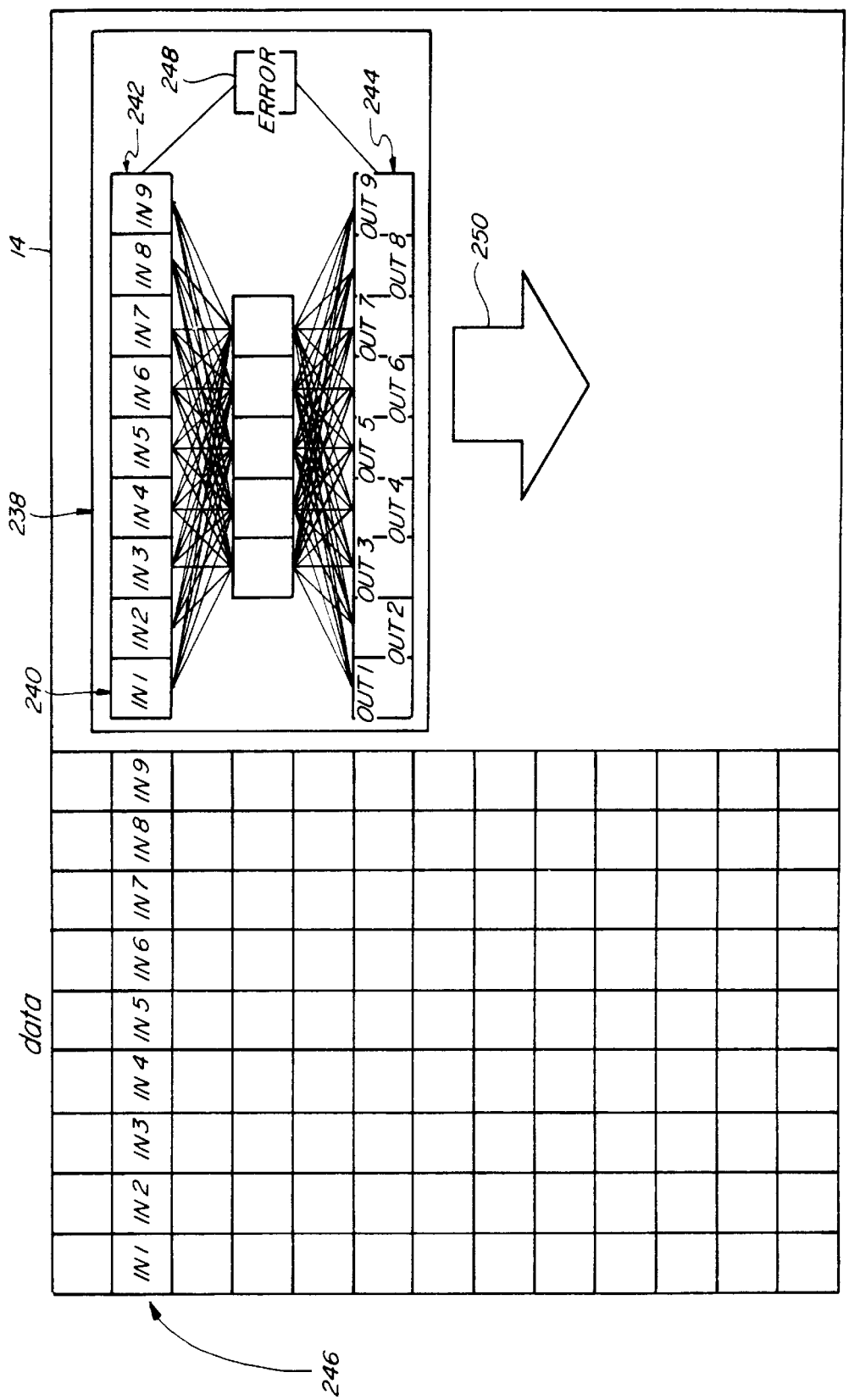
FIG. 28 illustrates a data filtering artificial neural network object.

Another neural network object which may be constructed is a data filtering neural network object or DFANNO 238 such as shown in FIG. 28. The underlying theory of the DFANNO 238 is that of an autoassociative neural network 240. The autoassociative neural network 240 is an artificial neural network which is trained to map inputs to themselves. Accordingly, an input vector within the knowledge domain of the autoassociative neural network 240 results in an output vector therefrom which closely matches the input vector. By way of example, if a vector v is applied at the input 242 of the autoassociative neural network 240, the network 240 will produce at its output 244 another vector v' representative of the closest vector seen in the training data or generalized from the training data. Using matrix notation, $Av=1v'$, where A represents the autoassociative neural network 240 and 1 is the unitary matrix with diagonal elements of 1. Thus, the equation may be rearranged into a general eigenvalue form $(A-1)v=\delta$, where $\delta$ represents the error or vector difference between input and output vectors of the autoassociative neural network 240. For a given input vector, if $\delta$ is 0, or close to 0, then the input vector fits the pattern of the training data the autoassociative neural network 240 was trained upon. On the other hand, as $\delta$ is progressively different from the zero vector, there is a greater likelihood that the associated input vector does not fall within the pattern of the training data, and therefore a greater likelihood that the input vector is either novel or the result of systematic error or random noise. Prior to operation, the autoassociative neural network 240 should be trained on a plurality of sets of control data. Each set of control data should be carefully selected so as to reflect the desired knowledge domain and so as to ensure that each set of control data has not been affected by systematic error or random noise.

Thus, as the DFANNO 238 moves through a data space 14 encountering different rows of data, such as 246, each representing an input vector thereto, an RMS error between each input vector and each output vector is determined as indicated at 248. If, for a given input vector, the error exceeds a predetermined level, the DFANNO 238 is then operable to perform some operation on the row 246 of data making up the input vector. For example, the row 246 of data may be deleted from the data space 14 entirely, relocated, or tagged as suspect. Thus, the DFANNO 238 is effective for moving through the data space 14, as indicated by arrow 250, and examining the data therein to find data which may have been caused by some systematic error or random noise introduced to the data or which occurred when the data was originally gathered.

A Visual Basic program 252 which achieves these operations is illustrated in FIG. 29. The calculate line 254 triggers all calculations within the data space 14. The For-Next Loop 256 is provided to determine if the DFANNO 238 has reached a point in the data space 14 where there is no more data, as indicated by all cells of a particular row being zero. If there is no more data the operation of DFANNO 238 is halted. Line 258 and portion 260 determine the operation the DFANNO 238 will take with respect to a particular row of data. In each of these lines cell (1,10) of the data space 14 represents a flag. If the flag is zero (0) the DFANNO 238 is in the data tag mode but if the flag is set to one (1) the DFANNO 238 is in the data destroy mode. With respect to line 258, if the RMS error at 248, between inputs and outputs of the autoassociative neural network 240, is greater than thirty (30) and if the flag is zero (0) then the cell immediately to the right of the data row is tagged with an asterisk, *. With respect to the program portion 260, if the RMS error is greater than thirty (30) and if the flag is set to one (1), the data values in the row are cleared from the data space 14. The final portion 262 of the program 252 causes the DFANNO 238 to move on to another row of data. Of course, this program is merely representative of software which could be utilized in association with data filtering artificial neural network objects.

Alternatively, the DFANNO 238 could be stationary within the data space 14 while data from some system or device to be monitored by the DFANNO 238 is fed into predetermined locations within the data space 14 through a dynamic data exchange, such that the DFANNO 238 operates on the data as it is fed through the data space 14. When suspect data is fed into the data space 14 and operated on by the DFANNO 238 the DFANNO 238 could be operable to shut down the system or device. Accordingly the DFANNO 238, either alone or in combination with other networks, provides an effective system monitor.

Figure 30:
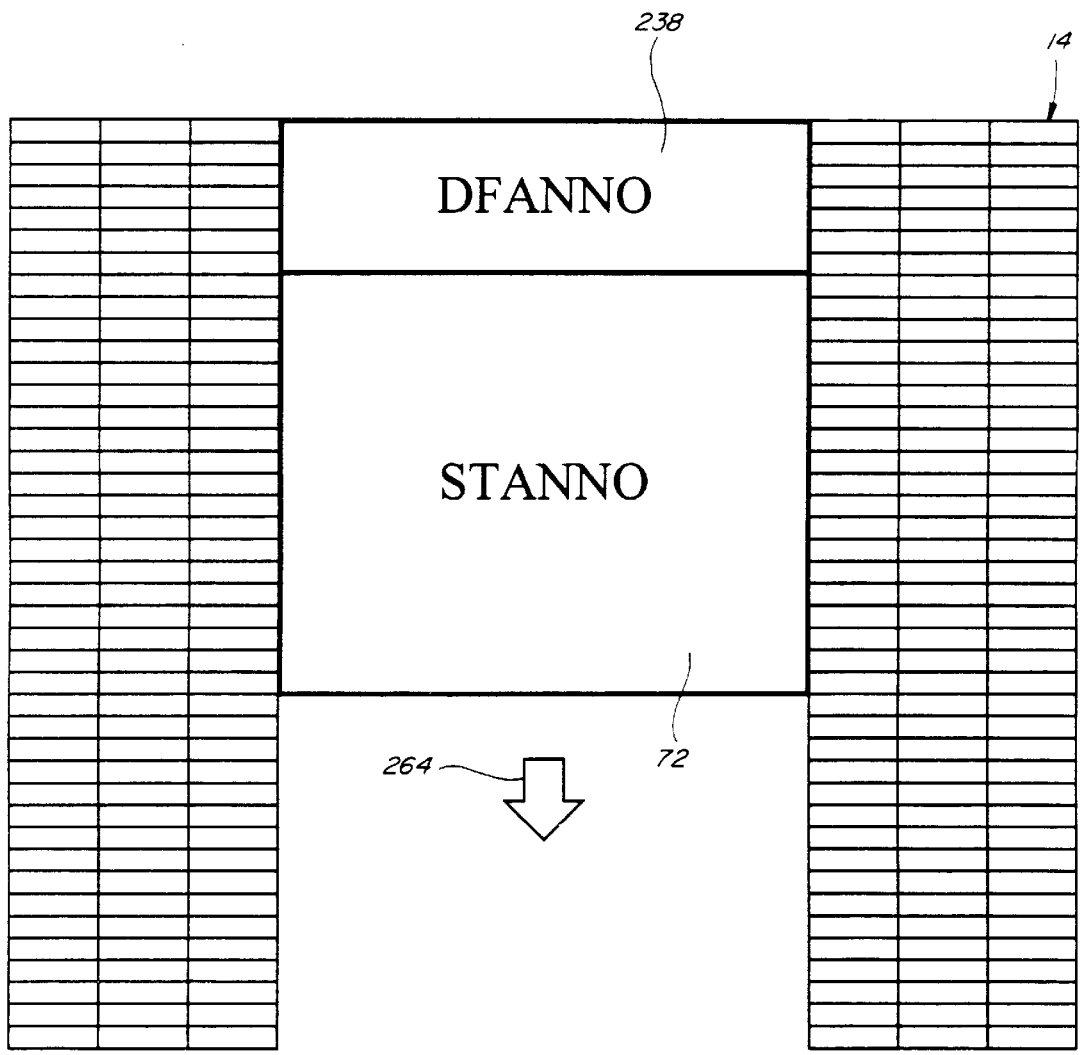
FIG. 30 is a block diagram illustration of a data filtering artificial neural network object associated with a self training artificial neural network object, both objects moving together through a data space.

Data filtering artificial neural networks can also advantageously be used in association with self training artificial neural networks. Such an association is illustrated in FIG. 30 wherein a DFANNO 238 has been appended to an STANNO 72 such that the two neural network objects move with each other through the data space 14 as shown by arrow 264. As the two objects move through the data space 14 the DFANNO 238 is operable to determine if the data at any given location is novel to the training of the STANNO 72. Thus, if the error determined by the DFANNO 238 exceeds a predetermined level, the data is considered novel and the STANNO 72 trains on such data. However, if the error is below the predetermined level the data at such location is considered old to the training of the STANNO 72, in which case the DFANNO 238 would be operable to cause the two associated neural network objects to move on to another set of data without allowing the STANNO 72 to train on the data, thereby reducing time wasted by retraining on redundant data.

Thus, as described above data filtering neural network objects of various configurations have a variety of useful applications, particularly in the areas of data monitoring for the purpose of finding novel data or data which may be suspect.

DATA SCANNING

Figure 31:
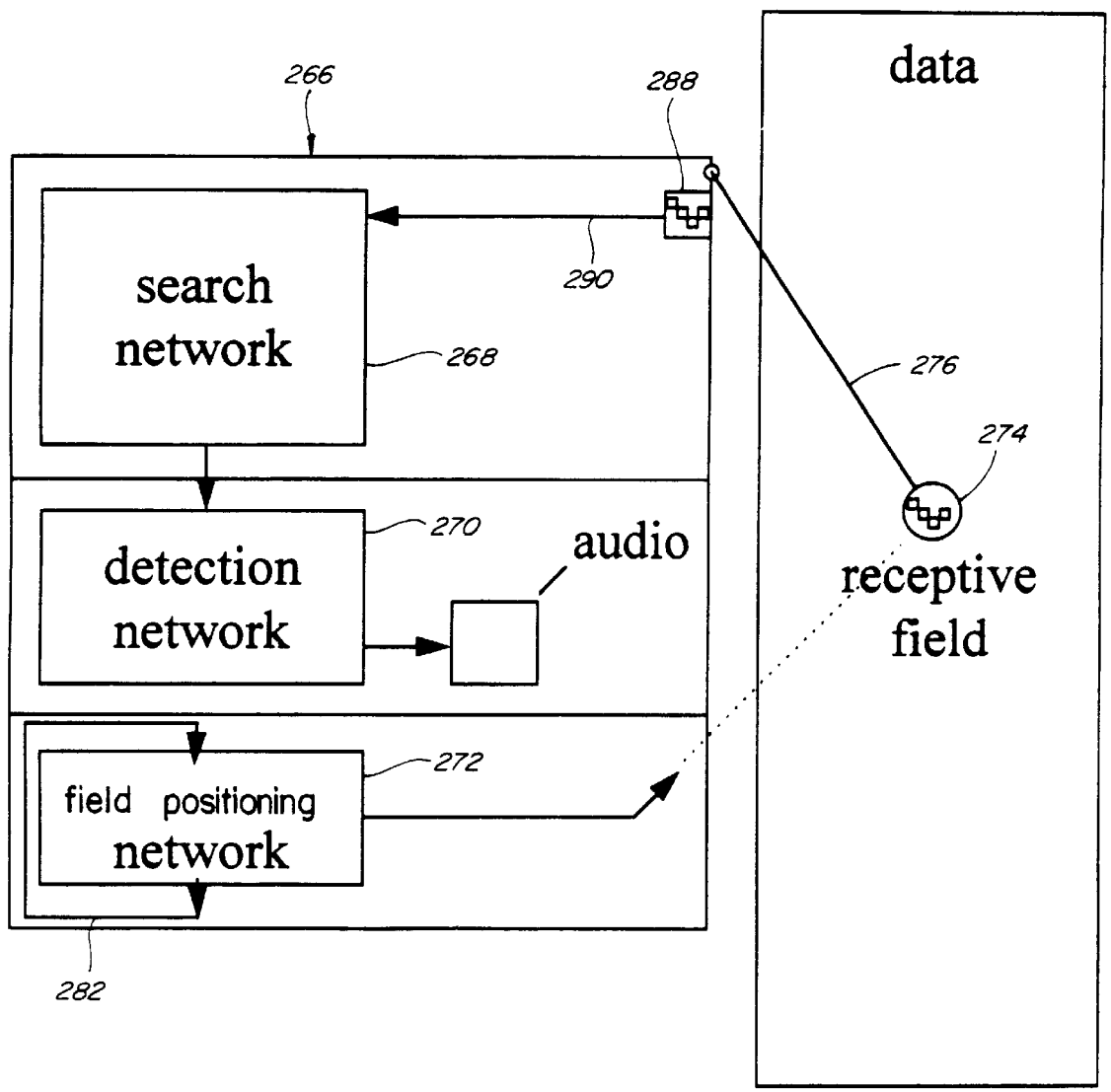
FIG. 31 is a block diagram illustration of a data scanning artificial neural network object, including a search network, a detection network, and a field positioning network.
Figure 32:
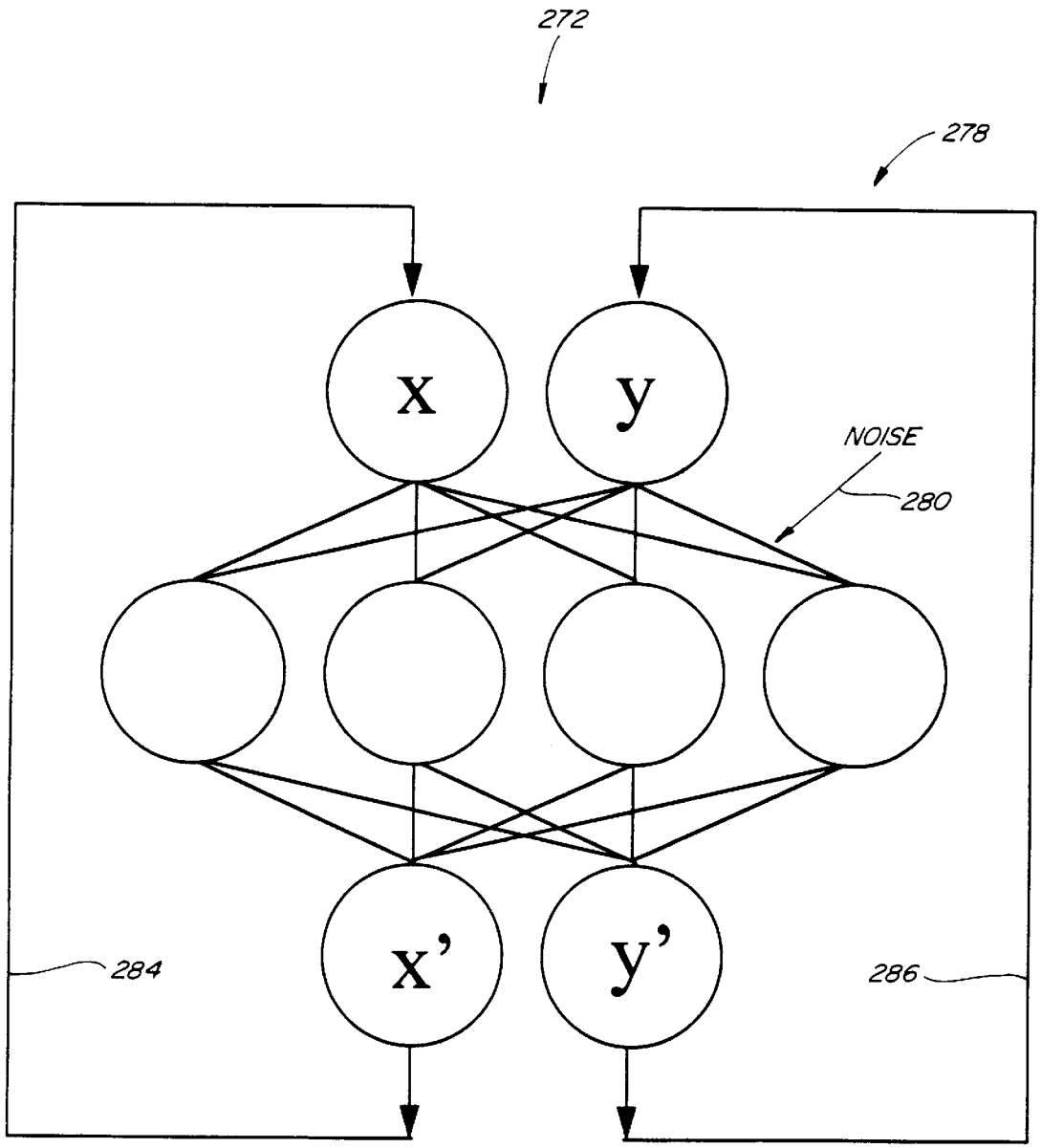
FIG. 32 is a nodal illustration of an autoassociative neural network which forms the field positioning network of FIG. 31.

FIG. 31 illustrates a block diagram configuration of a data scanning artificial neural network object or DSANNO 266. The DSANNO 266 is stationary within the data space 14 but capable of directing its view to various groups of cells within the data space 14 utilizing relative cell referencing. The DSANNO 266 includes a search network 268, a detection network 270, and a field positioning network 272. The field positioning network 272 autonomously moves the viewing field 274 of the DSANNO 266 about the data. The graphical antenna 276 may be utilized as a guide to the human viewer as to where the DSANNO 266 is focusing its attention, however, the antenna 276 is not required for operation of the DSANNO 266. Viewing field 274 positioning is achieved utilizing an autoassociative neural network 278 in which the weights and biases are subjected to noise sources, as shown by arrow 280 in FIG. 32, so that the autoassociative neural network 278 imagines various possibilities within its training domain. In this case, the noise source may be random numbers applied to the weights and biases of the autoassociative neural network 278. The autoassociative neural network 278 used is trained on a table of (x, y) values having integer values associated with the cells containing the data. Therefore, as the autoassociative neural network 278 is subjected to noise, it generates outputs reflecting the constraints within the training database, namely that it generate only integer values corresponding to data containing cells. In essence, the perturbed autoassociative neural network 278 is a random integer generator. However, by recirculating the networks 278 outputs back to the inputs, see line 282 of FIG. 31 and lines 284 and 286 of FIG. 32, a relatively smooth trajectory of viewing field 274 positions is generated because x and y coordinates are only gradually altered with each feedthrough cycle of this recurrent net. The net effect is this configuration is to produce continuous random movement of the viewing field 274 of the DSANNO 266, and is similar to the population-polling process used to govern human eye movement.

Figure 33:
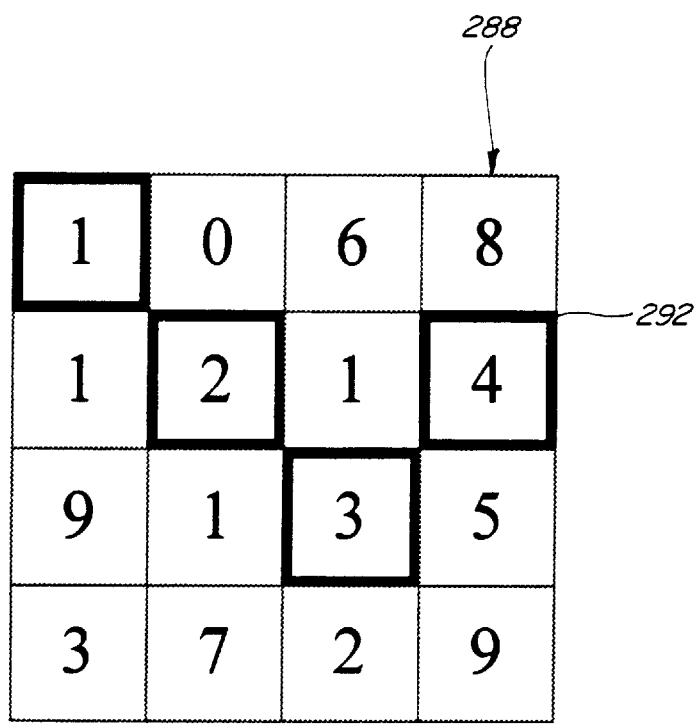
FIG. 33 illustrates an exemplary viewing field of the data scanning artificial neural network object of FIG. 31.
Figure 34:
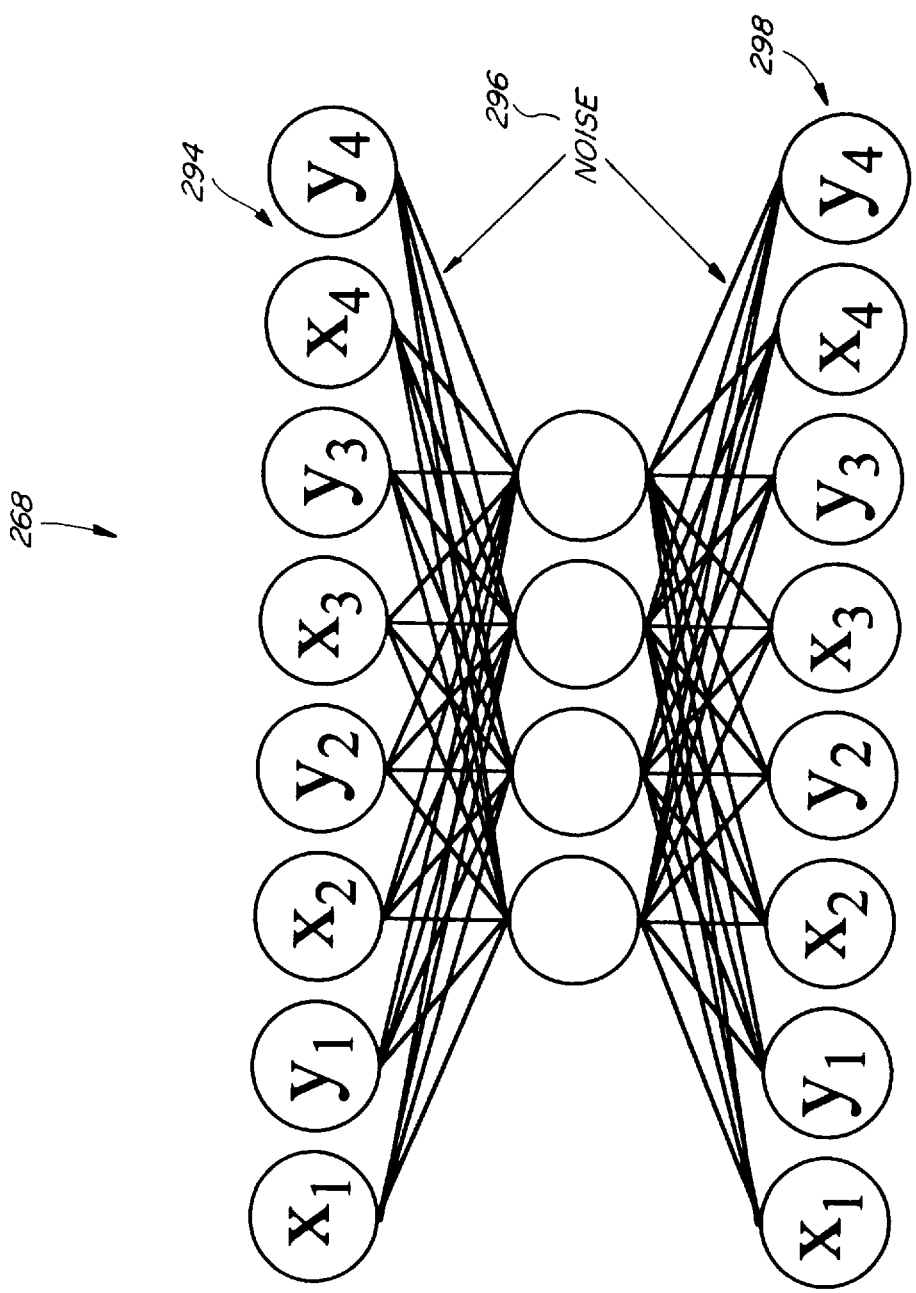
FIG. 34 is a nodal illustration of an autoassociative neural network which forms the search network of FIG. 31.
Figure 35:
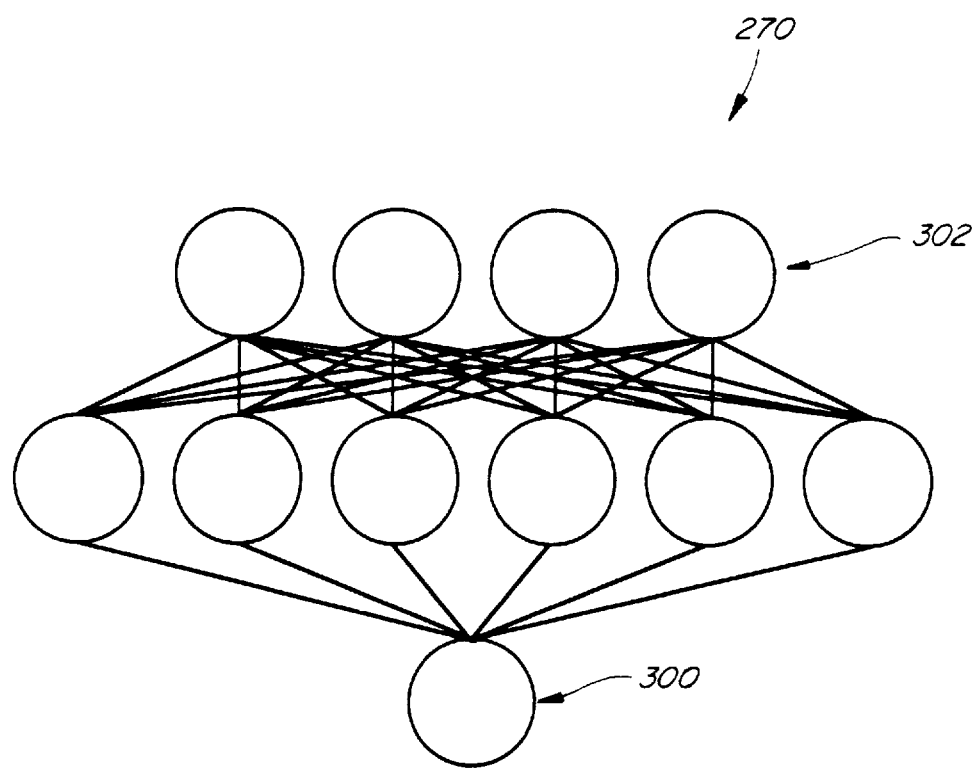
FIG. 35 is a nodal illustration of an exemplary detection network for the data scanning artificial neural network object of FIG. 31.

A group of imaging cells 288, see FIG. 31, utilize relative cell referencing to develop a working image of the viewing field 274. The working image may then be communicated to the search network 268 as indicated by arrow 290. By way of example, in FIG. 33 the imaging cells 288 of the DSANNO 266 are illustrated and include a 4×4 array of cells. The search network 268, illustrated in FIG. 34 is utilized to view the imaging cells 288 from a perspective such as that illustrated by the bold cells 292 of FIG. 33. The development of such a perspective is achieved utilizing an autoassociative neural network 294 which has been trained on numerous examples of data string configurations within the imaging cells 288. Noise 296 is then introduced to the network 294 such that the network 294 produces an imagined data string configuration at its output 298 which will be examined by the detection network 270 of FIG. 31. In this regard, an exemplary detection network 270 is illustrated in FIG. 35. This detection network 270 is trained to output a one at 300 if the inputs applied at input layer 302 obey the search criteria. The training domain can be chosen as required for a particular application. For example, the training domain may output a one when the inputs thereto have some predetermined relationship. The output of a one then acts to enable the DSANNO 266 to perform some operation such as tagging the data string, copying the data string to another portion of the data space 14, or enabling a wave file 304, see FIG. 31, which notifies a user that an appropriate data string was found. An appropriate program would be provided as required for a particular application.

Of course other data scanning neural network objects could include different viewing field configurations and could develop different data strings to be viewed by appropriate detection networks and DSANNO 266 is merely exemplary of the overall configuration. Accordingly, data scanning artificial neural network objects are useful for examining large databases for data strings having some predetermined, desired relationship, and then in some way identifying such data strings.

CREATIVITY MACHINES

As mentioned previously, the creativity machine paradigm involves progressively purturbing a first neural network, or imagination engine (IE), having a predetermined knowledge domain such that the perturbed network continuously outputs a stream of concepts, and monitoring the outputs or stream of concepts with a second neural network, or alert associative center (AAC), which is trained to identify only useful concepts. The perturbations may be achieved by different means, including the introduction of noise to the network, or degradation of the network. Such machines can be simulated within a data space in accordance with the present invention and also trained in as part of self training artificial neural network objects in accordance with the present invention. In a spreadsheet, the resident rand ( ) function may be utilized to alter the weights of the IE in order to achieve perturbation. Moreover, relative cell referencing facilitates feeding the outputs of the IE to the inputs of the AAC.

With respect to training, the simultaneous training capability illustrated in FIG. 23 is particularly applicable to training of the IE and the AAC of creativity machines because both the IE and the AAC will typically have at least some training data in common. At times it may be desirable to change the knowledge domain of the IE and/or the AAC. For example, if a creativity machine is trained in coffee mug design, the IE is initially trained on known, produced coffee mug shapes and the AAC is trained to recognize a good coffee mug shape from a bad coffee mug shape. Over time, the range of known, produced coffee mug shapes may increase, or, the public's perception of what a good coffee mug shape is may change. Thus, in order to keep the creativity machine up to date, both the IE and the AAC may need to be trained on new data. Utilizing the hereinbefore described training technique, both networks can be trained on new data without having to completely retrain either network on the data it had been trained on previously. Further, because the techniques described herein allow multiple neural network to run simultaneously, a creativity machine, including an IE and an AAC could run while replica IE and AAC networks train, with the replica IE and AAC networks being periodically copied and pasted into the IE and AAC networks of the creativity machine, thus continuously updatating the training of the creativity machine. Accordingly, many of the inventive features described herein are advantageously applicable to creativity machines.

From the preceding detailed description, it is evident that the objects of the invention are attained. In particular, a user friendly system of simulating neural networks has been provided. Further, various neural network object configurations have been described which provide self training artificial neural networks, data filtering, or data scanning, and a device prototyping system has also been described. Although these neural network objects and systems have been described and illustrated in detail, it is to be clearly understood that the same is intended by way of illustration and example only and is not to be taken by way of limitation.

For example, with reference to FIG. 1, it is understood that the data space cells utilized in simulating the neuron 10 need not be arranged as shown, but could be located in various portions of the data space. With respect to self training artificial neural networks, it is understood that there are numerous configurations for achieving the underlying invention which is a network training another network. Further, numerous programs could be associated with the self training artificial neural networks, as well as the data filtering and data scanning neural networks. Moreover, while such programs are described as located in separate but associated spreadsheets or data spaces, the various routines could be included within individual cells of the same spreadsheet or data space in which the neural networks are constructed. Accordingly, the spirit and scope of the invention are to be limited only by the terms of the appended claims.

What is claimed is:

1. A neural network based prototyping system for prototyping construction of a device from a plurality of known components, wherein a desired relationship between inputs and outputs of the device being prototyped is known, comprising:

a computer operable to electronically generate a data space including a plurality of cells which are interrelatable through relative cell referencing, a plurality of component neural networks, each component neural network trained within a knowledge domain of one of the known components so as to emulate a relationship between inputs and outputs to the known component, each component neural network implemented in said data space, a prototyping neural network implemented in said data space and including at least one hidden layer having a plurality of neurons, at least one hidden layer neuron represented by one of said component neural networks, and an output layer having at least one neuron, each hidden layer neuron and each output layer neuron having at least one numeric weighting value associated therewith for weighting inputs thereto, and means for adjusting at least some of said numeric weighting values so as to incorporate into said prototyping neural network a knowledge domain represented by the known desired relationship between inputs and outputs of the device being prototyped, so that, after said knowledge domain represented by the known desired relationship between inputs and outputs of the device being prototyped has been incorporated into said prototyping neural network, said numeric weighting values are indicative of how the known components should be interconnected in order to construct the device being prototyped.

2. A neural network based prototyping system in accordance with claim 1 wherein at least one output layer neuron being represented by one of said component neural networks.

3. A neural network based prototyping system in accordance with claim 1 wherein said means for adjusting at least some of said numeric weighting values includes a training network implemented in said data space, said training network operable to determine, for each hidden layer neuron and each output layer neuron, a derivative of an activation level thereof with respect to a net input thereto.

4. A neural network based prototyping system in accordance with claim 3 wherein said training network is further operable to determine a weight update term for each numeric weighting value to be adjusted, and said means for adjusting at least some of said numeric weighting values further includes a program associated with said prototyping neural network and said training network, said program operable to add each weight update term to its corresponding numeric weighting value.

5. A neural network based prototyping system in accordance with claim 3 wherein said training network is further operable to determine a new numeric value for each numeric weighting value to be adjusted, and said means for adjusting at least some of said numeric weighting values further includes a program associated with said prototyping neural network and said training network, said program operable to replace each numeric weighting value which is to be adjusted with its new numeric value.

6. A neural network based prototyping system in accordance with claim 1 wherein said means for adjusting at least some of said numeric weighting values includes a training network implemented in said data space, and means for applying a plurality of sets of training data to said prototyping neural network.

7. A neural network based prototyping system in accordance with claim 6 wherein said plurality of sets of training data are located within said data space and said means for applying a plurality of sets of training data to said prototyping neural network includes a program associated with said prototyping neural network and said training network, said program operable to effect movement said prototyping network within said data space such that with each movement thereof, a set of training data is applied to said prototyping neural network.

8. A method of utilizing neural networks to prototype a configuration of a device which will achieve a predetermined relationship between inputs thereto and outputs therefrom, wherein the device is to be constructed from a plurality of known components, each component simulated by a component neural network within a spreadsheet of a spreadsheet application, the component neural networks associated within the spreadsheet to form a prototyping neural network including a plurality of neurons, each neuron including at least one input, each input having an associated weight, wherein at least some of the neurons of the prototyping neural network are represented by one of the component neural networks, said method comprising the steps of:

(a) assigning a value to the weight associated with each input, (b) performing a training operation, said training operation comprising the steps of:
  (i) applying a training input to the prototyping neural network,
  (ii) determining within the spreadsheet, for each weight, a weight update term,
  (iii) adjusting each weight to reflect the determined weight update term,
  (iv) determining an error indicative of the training status of the prototyping neural network by comparing a desired training output to an actual output of the prototyping neural network, (c) repeating steps b(i) through b(iv) until said error falls below a predetermined value, and (d) correlating the weights of the prototyping neural network to how the known components should be interconnected to construct the device.

9. A method of utilizing neural networks to prototype a configuration of a device which will achieve a predetermined relationship between inputs thereto and outputs therefrom in accordance with claim 8, the predetermined relationship between inputs thereto and outputs therefrom represented by a plurality of known inputs and associated desired outputs, wherein step (b)(i) includes the prototyping neural network relatively referencing said training input.

10. A method of utilizing neural networks to prototype a configuration of a device which will achieve a predetermined relationship between inputs thereto and outputs therefrom in accordance with claim 8 wherein step (a) includes assigning a random value to the weight associated with each input.

11. A method of utilizing neural networks to prototype a configuration of a device which will achieve a predetermined relationship between inputs thereto and outputs therefrom in accordance with claim 8 wherein steps (b)(i) through (b)(iv) are performed each time a calculate function associated with the spreadsheet is activated.

12. A method of utilizing neural networks to prototype a configuration of a device which will achieve a predetermined relationship between inputs thereto and outputs therefrom in accordance with claim 8 wherein the repetition of steps (b)(i) through (b)(iv) is achieved by a program associated with the prototyping neural network.

13. A method of utilizing neural networks to prototype a configuration of a device which will achieve a predetermined relationship between inputs thereto and outputs therefrom in accordance with claim 8 wherein step (b)(ii) includes determining, for each neuron of the plurality of neurons, a derivative of activation level thereof with respect to net input thereto.

\* \* \* \* \*

UNITED STATES PATENT AND TRADEMARK OFFICE
CERTIFICATE OF CORRECTION

PATENT NO. : 5,852,815
DATED : December 22, 1998
INVENTOR(S) : Stephen L. Thaler It is certified that error appears in the above-identified patent and that said Letters Patent is hereby corrected as shown below:

Column 3, line 17, "advantageously." should be --advantageously--.

Column 7, line 33, "$X_2, X_3$" should be --$x_2, x_3$--.

Column 7, line 35, "$W_3$" should be --$w_3$--.

Column 8, line 15, "Such a" should be the beginning of a new paragraph.

Column 9, line 55, "x" should be --x--.

Column 9, line 60, "$x_p$" should be --$\mathbf{x}_p$--.

Column 9, line 63, "$x_p$" should be --$\mathbf{x}_p$--.

Column 16, line 8, "190.However," should be --190. However,--

Column 17, line 67, "v" should be --v--.

UNITED STATES PATENT AND TRADEMARK OFFICE
CERTIFICATE OF CORRECTION

PATENT NO. : 5,852,815
DATED : December 22, 1998
INVENTOR(S) : Stephen L. Thaler It is certified that error appears in the above-identified patent and that said Letters Patent is hereby corrected as shown below:

Column 18, line 2, "v'" should be --v'--.

Column 18, line 5, "Av=1v'," should be --Av=1v',--.

Column 18, line 5, "A" should be --A--.

Column 18, line 6, "1" should be --1--.

Column 18, line 8, "(A-1)v=δ, where δ" should be --(A-1)v=δ, where δ--.

Column 18, line 11, "δ is 0, or close to 0," should be --δ is 0, or close to 0,--.

Column 18, line 13, "δ" should be --δ--.

Signed and Sealed this

Sixth Day of April, 1999

Q. TODD DICKINSON

Attest:

Attesting Officer

Acting Commissioner of Patents and Trademarks